United States Patent
Borah et al.

(10) Patent No.: US 11,693,374 B2
(45) Date of Patent: Jul. 4, 2023

(54) BUILDING SYSTEM WITH STRING MAPPING BASED ON A SEQUENCE TO SEQUENCE NEURAL NETWORK

(71) Applicant: Johnson Controls Tyco IP Holdings LLP, Milwaukee, WI (US)

(72) Inventors: Surajit Borah, Bangalore (IN); Santle Camilus, Santa Clara, CA (US); ZhongYi Jin, Santa Clara, CA (US); Vish Ramamurti, San Leandro, CA (US); Young M. Lee, Old Westbury, NY (US)

(73) Assignee: JOHNSON CONTROLS TYCO IP HOLDINGS LLP, Milwaukee, WI (US)

( * ) Notice: Subject to any disclaimer, the term of this patent is extended or adjusted under 35 U.S.C. 154(b) by 53 days.

(21) Appl. No.: 16/885,968

(22) Filed: May 28, 2020

(65) Prior Publication Data

US 2021/0373510 A1    Dec. 2, 2021

(51) Int. Cl.
*G06F 40/30*    (2020.01)
*G05B 13/02*    (2006.01)
(Continued)

(52) U.S. Cl.
CPC ........... *G05B 13/027* (2013.01); *G05B 13/04* (2013.01); *G06F 40/30* (2020.01); *G06N 3/049* (2013.01)

(58) Field of Classification Search
CPC ....... G05B 13/027; G05B 13/04; G06F 40/30; G06N 3/049
See application file for complete search history.

(56) References Cited

U.S. PATENT DOCUMENTS

| | | | | | |
|---|---|---|---|---|---|
| 5,161,105 A | * | 11/1992 | Kugimiya | ............... | G06F 40/30 |
| | | | | | 704/4 |
| 5,634,084 A | * | 5/1997 | Malsheen | ............. | G06F 40/268 |
| | | | | | 704/260 |

(Continued)

FOREIGN PATENT DOCUMENTS

| CA | 2957726 A1 | 3/2016 |
|---|---|---|
| CA | 3043996 A1 | 2/2018 |

(Continued)

OTHER PUBLICATIONS

Olah, "Understanding LSTM Networks," Aug. 27, 2015, 8 pages.

(Continued)

*Primary Examiner* — Gary Collins
(74) *Attorney, Agent, or Firm* — Foley & Lardner LLP

(57) ABSTRACT

A building system including one or more memory devices configured to store instructions that, when executed by one or more processors, cause the one or more processors to receive training data including acronym strings and tag strings, train a sequence to sequence neural network based on the training data, receive an acronym string for labeling, the acronym string comprising a particular plurality of acronyms, and generate a tag string for the acronym string with the sequence to sequence neural network, wherein the sequence to sequence neural network outputs a tag of the tag string for one acronym of the particular plurality of acronyms based on the one acronym and contextual information of the acronym string, wherein the contextual information includes other acronyms of the particular plurality of acronyms.

22 Claims, 14 Drawing Sheets

(51) Int. Cl.
*G05B 13/04* (2006.01)
*G06N 3/049* (2023.01)

(56) References Cited

U.S. PATENT DOCUMENTS

| | | | | |
|---|---|---|---|---|
| 6,385,629 | B1* | 5/2002 | Sundaresan | G06F 16/2465 |
| | | | | 707/999.006 |
| 7,028,038 | B1* | 4/2006 | Pakhomov | G06F 40/284 |
| | | | | 707/765 |
| 7,136,876 | B1* | 11/2006 | Adar | G06F 16/355 |
| | | | | 704/265 |
| 7,236,923 | B1* | 6/2007 | Gupta | G06F 40/284 |
| | | | | 704/7 |
| 7,536,297 | B2* | 5/2009 | Byrd | G06F 40/289 |
| | | | | 704/251 |
| 7,548,847 | B2 | 6/2009 | Acero et al. | |
| 7,848,918 | B2* | 12/2010 | Li | G06F 40/40 |
| | | | | 704/270.1 |
| 7,983,901 | B2 | 7/2011 | Acero et al. | |
| 8,171,403 | B2* | 5/2012 | Flint | G06F 40/279 |
| | | | | 715/261 |
| 8,234,232 | B2 | 7/2012 | Song et al. | |
| 8,566,260 | B2 | 10/2013 | Suzuki et al. | |
| 8,739,031 | B2* | 5/2014 | Cheung | G06F 40/58 |
| | | | | 715/261 |
| 8,844,033 | B2 | 9/2014 | Song et al. | |
| 8,909,516 | B2 | 12/2014 | Medero et al. | |
| 9,020,805 | B2* | 4/2015 | Boguraev | G06F 40/274 |
| | | | | 704/9 |
| 9,031,832 | B2 | 5/2015 | Boguraev et al. | |
| 9,213,690 | B2* | 12/2015 | Feng | G06F 40/16 |
| 9,253,201 | B2 | 2/2016 | Song et al. | |
| 9,447,985 | B2 | 9/2016 | Johnson | |
| 10,083,170 | B2* | 9/2018 | Chowdhury | G06F 40/226 |
| 10,339,150 | B1 | 7/2019 | Silk et al. | |
| 10,572,597 | B2 | 2/2020 | Ackermann et al. | |
| 10,839,285 | B2* | 11/2020 | Guo | G06F 40/216 |
| 10,871,756 | B2 | 12/2020 | Johnson et al. | |
| 10,908,578 | B2 | 2/2021 | Johnson et al. | |
| 10,921,768 | B2 | 2/2021 | Johnson et al. | |
| 10,922,487 | B2* | 2/2021 | Patel | G06F 40/274 |
| 10,976,068 | B2 | 4/2021 | Hallendy et al. | |
| 11,030,482 | B2 | 6/2021 | Hayashi et al. | |
| 11,055,297 | B2 | 7/2021 | Silk et al. | |
| 11,156,978 | B2 | 10/2021 | Johnson et al. | |
| 2003/0212544 | A1 | 11/2003 | Acero et al. | |
| 2008/0033714 | A1 | 2/2008 | Gupta | |
| 2008/0059152 | A1* | 3/2008 | Fridman | G06F 40/247 |
| | | | | 704/9 |
| 2008/0086297 | A1* | 4/2008 | Li | G06F 40/40 |
| | | | | 704/3 |
| 2009/0254501 | A1 | 10/2009 | Song et al. | |
| 2009/0276380 | A1 | 11/2009 | Acero et al. | |
| 2011/0167493 | A1 | 7/2011 | Song et al. | |
| 2012/0084076 | A1 | 4/2012 | Boguraev et al. | |
| 2012/0084235 | A1 | 4/2012 | Suzuki et al. | |
| 2012/0330648 | A1 | 12/2012 | Boguraev et al. | |
| 2013/0110497 | A1 | 5/2013 | Medero et al. | |
| 2014/0066044 | A1* | 3/2014 | Ramnani | H04W 8/24 |
| | | | | 455/418 |
| 2014/0082104 | A1* | 3/2014 | Mann | H04L 51/063 |
| | | | | 709/206 |
| 2014/0288917 | A1* | 9/2014 | Orsini | G06Q 30/0201 |
| | | | | 704/2 |
| 2014/0373150 | A1 | 12/2014 | Song et al. | |
| 2015/0286629 | A1 | 10/2015 | Abdel-Reheem et al. | |
| 2016/0350652 | A1* | 12/2016 | Min | G06N 3/0445 |
| 2017/0154034 | A1 | 6/2017 | Zhang | |
| 2017/0199963 | A1 | 7/2017 | Kondadadi et al. | |
| 2018/0196921 | A1* | 7/2018 | Devarakonda | G06N 5/04 |
| 2018/0203848 | A1* | 7/2018 | Perez | G10L 25/30 |
| 2018/0375444 | A1 | 12/2018 | Gamroth | |
| 2019/0057611 | A1 | 2/2019 | Kneuper et al. | |
| 2019/0163740 | A1 | 5/2019 | Ackermann et al. | |
| 2020/0074224 | A1 | 3/2020 | Hayashi et al. | |
| 2020/0110753 | A1 | 4/2020 | Silk et al. | |
| 2020/0133978 | A1 | 4/2020 | Ramamurti et al. | |

FOREIGN PATENT DOCUMENTS

| | | |
|---|---|---|
| EP | 3 186 687 A4 | 7/2017 |
| EP | 3 497 377 A1 | 6/2019 |

OTHER PUBLICATIONS

Pirovano, A. "Attention Mechanisms," URL: http://chrome.ws.dei.polimi.it/images/0/0b/DL-G2-AttentionMechanisms.pdf, date unknown, 24 pages.

Point mapping public data set, https://github.com/plastering/plastering/tree/master/ groundtruth, accessed on May 5, 2019, 1 page.

Ratinov et al., "Design challenges and misconceptions in named entity recognition", Proceedings of the Thirteenth Conference on Computational Natural Language Learning (CoNLL), Jun. 2009, pp. 147-155.

SpaCy, URL: https://pypi.org/project/spacy/, accessed on May 5, 2019, 10 pages.

Subword-nmt, URL: https://github.com/rsennrich/subword-nmt, accessed on May 5, 2019, 3 pages.

Sutton et al., "An Introduction to Conditional Random Fields", Foundations and Trends in Machine Learning, vol. 4, No. 4 (2011), 2012, pp. 267-373.

Balaji et al., "Brick: Towards a Unified Metadata Schema for Buildings," dated Nov. 16-17, 2016, 10 pages.

Balaji et al., "Zodiac: Organizing large deployment of sensors to create reusable applications for buildings", BuildSys, 2015, pp. 13-22.

Fuzzy String Matching, URL: https://github.com/seatgeek/fuzzywuzzy, accessed on May 5, 2019, 3 pages.

Google Neural Machine Translation, URL: https://github.com/tensorflow/nmt, accessed on May 5, 2019, 19 pages.

Koh et al., "Poster: Scrabble: Converting Unstructured Metadata into Brick for Many Buildings," BuildSys, 2017, 2 pages.

Koh et al., "Scrabble: Transferrable Semi-Automated Semantic Metadata Normalization using Intermediate Representation," Nov. 7-8, 2018, 10 pages.

Koh, "Metadata Organization for Energy Efficient Operation of Smart Buildings," URL: https://www.ucop.edu/carbon-neutrality-initiative/_images/cni%20posters/2018/koh_cni.pdf, 2018, 1 page.

Lafferty et al., "Conditional random fields: Probabilistic models for segmenting and labeling sequence data", In Proceedings of the eighteenth international conference on machine learning, ICML, vol. 1, 2001, pp. 282-289.

Hahn et al., "Cross-Language Mining for Acronyms and Their Completions from the Web," Discovery Science, 8th International Conference, DS 2005, Singapore, Oct. 2005, Proceedings, LNAI 3735, Springer-Verlag, Berlin-Heidelberg, 2005 (pp. 113-123).

Liu et al., "Learning Conditional Random Fields with Latent Sparse Features for Acronym Expansion Finding", CIKM'11, Glasgow, Scotland, UK, Oct. 24-28, 2011 (6 pages).

CoolingLogic, "CoolingLogic: Up early, saving billions." URL: http://coolinglogic.com/documents/MarketingFlyer_FINAL_HiRes8.5x11.pdf, retrieved from internet Oct. 27, 2022 (1 page).

Incomplete File of Communication with Various Companies, etc. in 2016-2021, URL: http://coolinglogic.com/documents/22072101_Letters_and_Signature_Receipts.pdf, published, as one document, on: Jul. 21, 2022 (211 pages).

Johnson Heating and Cooling L.L.C., "Divine Grace Building Automation (Images)," URL: http://cooljohnson.com/Building-Automation-Systems-Michigan/Oakland-County-Michigan/Building-Automation-Images.html, retrieved from internet Oct. 27, 2022 (8 pages).

Johnson Heating and Cooling L.L.C., "Divine Grace Building Automation," URL: http://cooljohnson.com/Building-Automation-Systems-Michigan/Oakland-County-Michigan/Building-Automation-Divine-Grace.html, retrieved from internet Oct. 27, 2022 (3 pages).

(56) References Cited

OTHER PUBLICATIONS

Johnson Heating and Cooling L.L.C., "Excel Rehabilitation Building Automation," URL: http://cooljohnson.com/Building-Automation-Systems-Michigan/Waterford-Michigan/Building-Automation-System--Excel.html, retrieved from internet Oct. 27, 2022 (2 pages).

Johnson Heating and Cooling L.L.C., "Intertek Testing Services Building Automation," URL: http://cooljohnson.com/Building-Automation-Systems-Michigan/Plymouth-Michigan/Building-Automation-System-Plymouth-Michigan.html, retrieved from internet Oct. 27, 2022 (8 pages).

Johnson Heating and Cooling L.L.C., "JLA Medical Building Building Automation," URL: http://cooljohnson.com/Building-Automation-Systems-Michigan/Waterford-Michigan/Building-Automation-System--JLA.html, retrieved from internet Oct. 27, 2022 (3 pages).

Johnson Heating and Cooling L.L.C., "Mosaic Christian Building Automation (Images)," URL: http://cooljohnson.com/Building-Automation-Systems-Michigan/Detroit/Building-Automation-Images.html, retrieved from internet Oct. 27, 2022 (12 pages).

Johnson Heating and Cooling L.L.C., "Mosaic Christian Building Automation," URL: http://cooljohnson.com/Building-Automation-Systems-Michigan/Detroit/Mosaic-Christian.html, retrieved from internet Oct. 27, 2022 (5 pages).

Johnson Heating and Cooling L.L.C., "Shepherd's Gate Lutheran Church Building Automation," URL: http://cooljohnson.com/Building-Automation-Systems-Michigan/Shelby-Township-Michigan/Building-Automation-Systems-SG.html, retrieved from internet Oct. 27, 2022 (3 pages).

Johnson Heating and Cooling L.L.C., "St. Clair County Residence Building Automation," URL: http://cooljohnson.com/Building-Automation-Systems-Michigan/St-Clair-Michigan/Building-Automation-System-St-Clair-Michigan.html, retrieved from internet Oct. 27, 2022 (4 pages).

Johnson Heating and Cooling L.L.C., "St. Joseph Mercy Oakland U. C. Building Automation," URL: http://cooljohnson.com/Building-Automation-Systems-Michigan/Waterford-Michigan/Building-Automation-Systems-SJMO.html, retrieved from internet Oct. 27, 2022 (2 pages).

Johnson Heating and Cooling L.L.C., "Waterford Internal Medicine Building Automation," URL: http://cooljohnson.com/Building-Automation-Systems-Michigan/Waterford-Michigan/Building-Automation-Systems-WIM.html, retrieved from internet Oct. 27, 2022 (3 pages).

Johnson Heating and Cooling L.L.C., "Building Automation Clawson Michigan 2.0," URL: http://cooljohnson.com/Building-Automation-Systems-Michigan/Clawson-Michigan/Building-Automation-Clawson-Manor-2.html, retrieved from the internet Oct. 27, 2022 (6 pages).

Johnson Heating and Cooling L.L.C., "Building Automation Images Clawson Michigan 2.0," URL: http://cooljohnson.com/Building-Automation-Systems-Michigan/Clawson-Michigan/Building-Automation-Clawson-Manor-2-Images.html, retrieved from the internet Oct. 27, 2022 (14 pages).

Johnson Heating and Cooling L.L.C., "Building Automation System Clawson Michigan Clawson Manor," URL: http://cooljohnson.com/Building-Automation-Systems-Michigan/Clawson-Michigan/Building-Automation-System-Clawson-Manor.html; retrieved from the internet Oct. 27, 2022 (3 pages).

Johnson Heating and Cooling L.L.C., "Building Automation System in Michigan Images," URL: http://cooljohnson.com/Building-Automation-Systems-Michigan/Macomb-County-Michigan/Building-Automation-Images.html; retrieved from the internet Oct. 27, 2022 (13 pages).

Johnson Heating and Cooling L.L.C., "Building Automation System in Michigan," URL: http://cooljohnson.com/Building-Automation-Systems-Michigan/Macomb-County-Michigan/Building-Automation-Confidential-Customer.html; retrieved from the internet, Oct. 27, 2022 (4 pages).

Johnson Solid State LLC, "So what is CoolingLogic™?" URL: http://coolinglogic.com/Coolinglogic-How-it-Works.html, retrieved from the internet Oct. 27, 2022 (3 pages).

Johnson, David, "A Method to Increase HVAC System Efficiency and Decrease Energy Consumption," White Paper: Johnson Solid State, L.L.C., URL: http://coolinglogic.com/documents/16102106_White_Paper_High_Resolution_Protected.pdf, Sep. 24, 2016 (51 pages).

Johnson, David, "CoolingLogic™: Mosaic Christian Church A Case Study," Report: Johnson Solid State, LLC, URL: http://coolinglogic.com/documents/19020301_Mosaic_Christian_Coolinglogic_Case_Study.pdf, Feb. 2, 2019 (140 pages).

Johnson, David, "Excel Rehabilitation Building Automation: Building Automation System User Manual," URL: http://cooljohnson.com/Building-Automation-Systems-Michigan/Waterford-Michigan/Building-Automation-System-Excel-Manual.html, 2012 (10 pages).

Johnson, David., "CoolingLogic™: Changing the Way You Cool," Report: Johnson Solid State, LLC, URL: http://coolinglogic.com/documents/18111303_Changing_the_way_you_Cool.pdf, Nov. 7, 2018 (12 pages).

Johnson, David, "Temperature Control System and Methods for Operating Same," Pre-Publication printout of U.S. Appl. No. 15/231,943, filed Aug. 9, 2016, URL: http://coolinglogic.com/documents/16080901_CIP_As_Filed.pdf (99 pages).

Johnson Solid State LLC, "Building Automation Equipment," URL: http://cooljohnson.com/Video/Building_Automation/Confidential_Customer_BLD_2/Building_Automation_Equipment.mp4, retrieved from internet Oct. 27, 2022 (35 pages).

Johnson Solid State LLC, "Building Automation GUI," URL: http://cooljohnson.com/Video/Building_Automation/Confidential_Customer_BLD_2/Building_Automation_GUI.mp4, retrieved from internet Oct. 27, 2022 (24 pages).

Johnson Solid State LLC, "Cooling Logic Overview," URL: http://coolinglogic.com/documents/CoolingLogic_Overview_High_Quality.mp4, retrieved from internet Oct. 27, 2022 (16 pages).

* cited by examiner

BUILDING SYSTEM WITH STRING MAPPING BASED ON A SEQUENCE TO SEQUENCE NEURAL NETWORK

BACKGROUND

The present disclosure relates generally to building systems. More particularly, the present disclosure relates to mapping points of a building included within a string.

Buildings may include points such as sensors, actuators, controllers, or other devices and systems that handle various building sensing and/or control operations for environmental parameters such as temperature, humidity, air quality, and/or sound. In some cases, these points are named subjectively by an operator using acronyms. In some cases, to deploy systems or equipment (e.g., Internet of Things (IoT) devices), it may be necessary to translate the user created acronyms into standard names, e.g., tags. Various systems that facilitate energy optimization, device localization, visualization (which may rely on indicators device interconnectivity) may rely on the standard names.

Some methods for performing the mapping of building points perform poorly. For example, a dictionary based mapping method may fail as there exists many to many mapping relationship between acronyms and tags. A many to many relationship between acronyms and tags, i.e., one acronym mapping to multiple tags, may not be properly handled by a dictionary based mapping method.

SUMMARY

Sequence to Sequence Neural Network String Mapping

One implementation of the present disclosure is a building system including one or more memory devices configured to store instructions thereon that, when executed by one or more processors, cause the one or more processors to receive training data including acronym strings each including acronyms and tag strings each including tags. Each string of the tag strings is a translation of one acronym string of the acronym strings, wherein the acronyms represent entities of a building. The instructions cause the one or more processors to train a sequence to sequence neural network based on the training data, receive an acronym string for labeling, the acronym string including a particular acronyms, and generate a tag string for the acronym string with the sequence to sequence neural network, wherein the sequence to sequence neural network outputs each tag of the tag string for one acronym of the particular acronyms based on the one acronym and contextual information of the acronym string, wherein the contextual information includes other acronyms of the acronyms.

In some embodiments, the sequence to sequence neural network is a long-short term memory (LSTM) sequence to sequence neural network.

In some embodiments, the instructions cause the one or more processors to determine a number of strings of the acronym strings, compare the number of strings to a threshold level, and select the sequence to sequence neural network for translating the tag string from a group of available translation models in response to a determination that the number of strings is greater than the threshold level.

In some embodiments, the instructions cause the one or more processors to receive the training data from a training database, wherein the training data is based on data of one or more buildings and the tag string is associated with the building.

In some embodiments, the instructions cause the one or more processors to remove at least one of spaces or special characters from the acronym strings, apply a segmentation model to the acronym strings to identify the particular acronyms, generate an acronym vocabulary by removing redundant acronyms from the particular acronyms, and train the sequence to sequence neural network based on the training data and the acronym vocabulary.

In some embodiments, the instructions cause the one or more processors to receive a selection of a training function for training the sequence to sequence neural network from a user device, wherein the training function is at least one of a fully automatic training function wherein the sequence to sequence neural network is trained based on a training data set and inference with the sequence to sequence neural network is performed on a separate inference data set or a semi-automatic training function wherein the sequence to sequence neural network is trained on a portion of the inference data set and inference with the sequence to sequence neural network is performed with a remaining portion of the inference data set.

In some embodiments, the semi-automatic training function is at least one of a manual selection function or a clustering function, wherein the manual selection function includes receiving a selection of the portion of the inference data set from a user device, wherein the clustering function includes identifying the portion of the inference data set by clustering the inference data set.

In some embodiments, the sequence to sequence neural network includes an encoder that encodes the acronym string, a decoder that decodes hidden states of the sequence to sequence neural network into the tag string, and an attention function that generates an attention vector that weights an output of the decoder.

In some embodiments, the attention function is based on one hidden state of the decoder and hidden states of the encoder, each of the hidden states associated with at least one of the particular acronyms. In some embodiments, the attention vector weights the one hidden state of the decoder across target tags.

In some embodiments, the sequence to sequence neural network implements a many to many mapping between the particular acronyms and target tags.

In some embodiments, the many to many mapping maps the one acronym of the particular acronyms to a first target tag when the contextual information is first contextual information and to a second target tag when the contextual information is second contextual information and a different acronym of the particular acronyms to the first target tag based on other contextual information associated with the different acronym, wherein the one acronym and the different acronym include different characters.

In some embodiments, the instructions cause the one or more processors to receive a set of acronym strings for the building for translation, select the acronym strings from the set of acronym strings, receive the tag strings from a user device, each of the tag strings being the translation of one of the acronym strings, train the sequence to sequence neural network based on the training data, and translate remaining acronym strings of the set of acronym strings with the sequence to sequence neural network.

In some embodiments, the instructions cause the one or more processors to receive a manual selection of the acronym strings from the user device.

In some embodiments, the instructions cause the one or more processors to receive the plurality of tag strings from the user device via user input provided by a user via the user device, the user input indicating tag translations of particular acronyms of the plurality of acronym strings.

In some embodiments, the instructions cause the one or more processors to select the acronym strings from the set of acronym strings by determining a similarity metric between acronym strings of the set of acronym strings, generate clusters by grouping the acronym strings based on the similarity metric between the acronym strings of the set of acronym strings, and select the acronym strings from the set of acronym strings by selecting one or more acronym strings from each of the clusters.

In some embodiments, the instructions cause the one or more processors to cause the user device to display the plurality of acronym strings to the user for manual translation.

Another implementation of the present disclosure is a method including receiving, by one or more processing circuits, training data including acronym strings each including acronyms and tag strings each including tags, wherein each string of the tag strings is a translation of one acronym string of the acronym strings, wherein the acronyms represent entities of a building. The method further includes training, by the one or more processing circuits, a sequence to sequence neural network based on the training data, receiving, by the one or more processing circuits, an acronym string for labeling, the acronym string including acronyms, and generating, by the one or more processing circuits, a tag string for the acronym string with the sequence to sequence neural network, wherein the sequence to sequence neural network outputs each tag of the tag string for one acronym of the particular acronyms based on the one acronym and contextual information of the acronym string, wherein the contextual information includes other acronyms of the particular acronyms.

In some embodiments, the sequence to sequence neural network is a long-short term memory (LSTM) sequence to sequence neural network.

In some embodiments, the method includes determining, by the one or more processing circuits, a number of strings of the acronym strings, comparing, by the one or more processing circuits, the number of strings to a threshold level, and selecting, by the one or more processing circuits, the sequence to sequence neural network for translating the tag string from a group of available translation models in response to a determination that the number of strings is greater than the threshold level.

In some embodiments, the sequence to sequence neural network includes an encoder that encodes the acronym string, a decoder that decodes hidden states of the sequence to sequence neural network into the tag string, and an attention function that generates an attention vector that weights an output of the decoder.

In some embodiments, the attention function is based on one hidden state of the decoder and hidden states of the encoder, each of the hidden states associated with at least one of the particular acronyms. In some embodiments, the attention vector weights the one hidden state of the decoder across target tags.

In some embodiments, the sequence to sequence neural network implements a many to many mapping between the acronyms and target tags.

In some embodiments, the many to many mapping maps the one acronym of the particular acronyms to a first target tag when the contextual information is first contextual information and to a second target tag when the contextual information is second contextual information and a different acronym of the particular acronyms to the first target tag based on other contextual information associated with the different acronym, wherein the one acronym and the different acronym include different characters.

Another implementation of the present disclosure is one or more storage medium configured to store instructions thereon, that, when executed by one or more processors, cause the one or more processors to receive training data including acronym strings each including acronyms and tag strings each including tags, wherein each string of the tag strings is a translation of one acronym string of the acronym strings, train a sequence to sequence neural network based on the training data, receive an acronym string for labeling, the acronym string including a particular acronyms, and generate a tag string for the acronym string with the sequence to sequence neural network, wherein the sequence to sequence neural network outputs each tag of the tag string for one acronym of the particular acronyms based on the one acronym and contextual information of the acronym string, wherein the contextual information includes other acronyms of the particular acronyms.

Statistical Model Based String Mapping

One implementation of the present disclosure is a building system including one or more memory devices configured to store instructions thereon that, when executed by one or more processors, cause the one or more processors to receive training data including acronym strings each including acronyms and tag strings each including tags, wherein each string of the tag strings is a translation of one acronym string of the acronym strings, wherein the acronyms represent entities of a building, train a statistical model based on the training data, receive an acronym string for labeling, the acronym string including a particular acronyms, and generate a tag string for the acronym string with the statistical model, wherein the statistical model outputs each tag of the tag string for one acronym of the particular acronyms based on the one acronym and contextual information of the acronym string, wherein the contextual information includes other acronyms of the particular acronyms, wherein the statistical model implements a many to many mapping between the particular acronyms and target tags.

In some embodiments, the instructions cause the one or more processors to determine a number of strings of the acronym strings, compare the number of strings to a threshold level, and select the statistical model for translating the tag string from a group of available translation models including the statistical model and a neural network model in response to a determination that the number of strings is less than the threshold level.

In some embodiments, the instructions cause the one or more processors to receive the training data from a training database, wherein the training data is based on data of one or more buildings and the tag string is associated with the building.

In some embodiments, the instructions cause the one or more processors to receive a selection of a training function for training the statistical model from a user device, wherein the training function is at least one of a fully automatic training function wherein the statistical model is trained based on a training data set and inference with the statistical model is performed on a separate inference data set or a semi-automatic training function wherein the statistical model is trained on a portion of the inference data set and inference with the statistical model is performed with a remaining portion of the inference data set.

In some embodiments, the semi-automatic training function is at least one of a manual selection function or a clustering function, wherein the manual selection function includes receiving a selection of the portion of the inference data set from a user device, wherein the clustering function includes identifying the portion of the inference data set by clustering the inference data set.

In some embodiments, the instructions cause the one or more processors to, remove at least one of spaces or special characters from the acronym strings, apply a segmentation model to the acronym strings to identify the particular acronyms, generate an acronym vocabulary by removing redundant acronyms from the particular acronyms, and train the statistical model based on the training data and the acronym vocabulary.

In some embodiments, the many to many mapping maps the one acronym of the particular acronyms to a first target tag when the contextual information is first contextual information and to a second target tag when the contextual information is second contextual information and a different acronym of the particular acronyms to the first target tag based on other contextual information associated with the different acronym, wherein the one acronym and the different acronym include different characters.

In some embodiments, the instructions cause the one or more processors to receive a set of acronym strings for the building for translation, select the acronym strings from the set of acronym strings, receive the tag strings from a user device, each of the tag strings being the translation of one of the acronym strings, train the statistical model based on the training data, and translate remaining acronym strings of the set of acronym strings with the statistical model.

In some embodiments, the instructions cause the one or more processors to receive a manual selection of the acronym strings from the user device.

In some embodiments, the instructions cause the one or more processors to receive the plurality of tag strings from the user device via user input provided by a user via the user device, the user input indicating tag translations of particular acronyms of the plurality of acronym strings.

In some embodiments, the instructions cause the one or more processors to select the acronym strings from the set of acronym strings by determining a similarity metric between the strings of the set of acronym strings, generate clusters by grouping the strings based on the similarity metric between the strings of the set of acronym strings, and select the acronym strings from the set of acronym strings by selecting one or more strings from each of the clusters.

In some embodiments, the instructions cause the one or more processors to cause the user device to display the plurality of acronym strings to the user for manual translation.

In some embodiments, the statistical model is a conditional random field (CRF) model.

In some embodiments, the CRF model is a graph including nodes and edges between the nodes, the edges indicating conditional probabilities between the nodes, wherein each of the nodes represent a random variable. In some embodiments, the nodes include input nodes, each input node of the input nodes associated with a particular acronym of the acronyms. In some embodiments, the nodes include output nodes, each output node of the output nodes associated with tags of the tag string.

In some embodiments, each of the output nodes is connected by a first edge of the edges to one input node and one or more second edges of the edges to one or more neighboring output nodes of the output nodes.

Another implementation of the present disclosure is a method including receiving, by one or more processing circuits, training data including acronym strings each including acronyms and tag strings each including tags, wherein each string of the tag strings is a translation of one acronym string of the acronym strings, wherein the acronyms represent entities of a building, training, by the one or more processing circuits, a statistical model based on the training data, receiving, by the one or more processing circuits, an acronym string for labeling, the acronym string including particular acronyms, and generating, by the one or more processing circuits, a tag string for the acronym string with the statistical model, wherein the statistical model outputs each tag of the tag string for one acronym of the particular acronyms based on the one acronym and contextual information of the acronym string, wherein the contextual information includes other acronyms of the particular acronyms, wherein the statistical model implements a many to many mapping between the particular acronyms and target tags.

In some embodiments, the many to many mapping maps the one acronym of the particular acronyms to a first target tag when the contextual information is first contextual information and to a second target tag when the contextual information is second contextual information and a different acronym of the particular acronyms to the first target tag based on other contextual information associated with the different acronym, wherein the one acronym and the different acronym include different characters.

In some embodiments, the method further includes determining, by the one or more processing circuits, a number of strings of the acronym strings, comparing, by the one or more processing circuits, the number of strings to a threshold level, and selecting, by the one or more processing circuits, the statistical model for translating the tag string from a group of available translation models including the statistical model and a neural network model in response to a determination that the number of strings is less than the threshold level.

In some embodiments, the method includes receiving, by the one or more processing circuits, a set of acronym strings for the building for translation, selecting, by the one or more processing circuits, the acronym strings from the set of acronym strings, receiving, by the one or more processing circuits, the tag strings from a user device, each of the tag strings being the translation of one of the plurality of acronym strings, training, by the one or more processing circuits, the statistical model based on the training data, and translating, by the one or more processing circuits, remaining acronym strings of the set of acronym strings with the statistical model.

In some embodiments, selecting, by the one or more processing circuits, the acronym strings from the set of acronym strings includes determining a similarity metric between the strings of the set of acronym strings, generate clusters by grouping the strings based on the similarity metric between the strings of the set of acronym strings, and select the acronym strings from the set of acronym strings by selecting one or more strings from each of the clusters.

In some embodiments, the statistical model is a conditional random field (CRF) model.

In some embodiments, the CRF model is a graph including nodes and edges between the nodes, the edges indicating conditional probabilities between the nodes, wherein each of the nodes represent a random variable. In some embodiments, the nodes include input nodes, each input node of the input nodes associated with a particular acronym of the acronyms. In some embodiments, the nodes include output nodes, each output node of the output nodes associated with tags of the tag string.

In some embodiments, each of the output nodes is connected by a first edge of the edges to one input node and one or more second edges of the edges to one or more neighboring output nodes of the output nodes.

Another implementation of the present disclosure is one or more storage medium configured to store instructions thereon that, when executed by one or more processors, cause the one or more processors to receive training data including acronym strings each including acronyms and tag strings each including tags, wherein each string of the tag strings is a translation of one acronym string of the acronym strings, wherein the acronyms represent entities of a building, train a statistical model based on the training data, receive an acronym string for labeling, the acronym string including particular acronyms, and generate a tag string for the acronym string with the statistical model, wherein the statistical model outputs each tag of the tag string for one acronym of the particular acronyms based on the one acronym and contextual information of the acronym string, wherein the contextual information includes other acronyms of the particular acronyms, wherein the statistical model implements a many to many mapping between the particular acronyms and target tags.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

DETAILED DESCRIPTION

Overview

Figure 1:
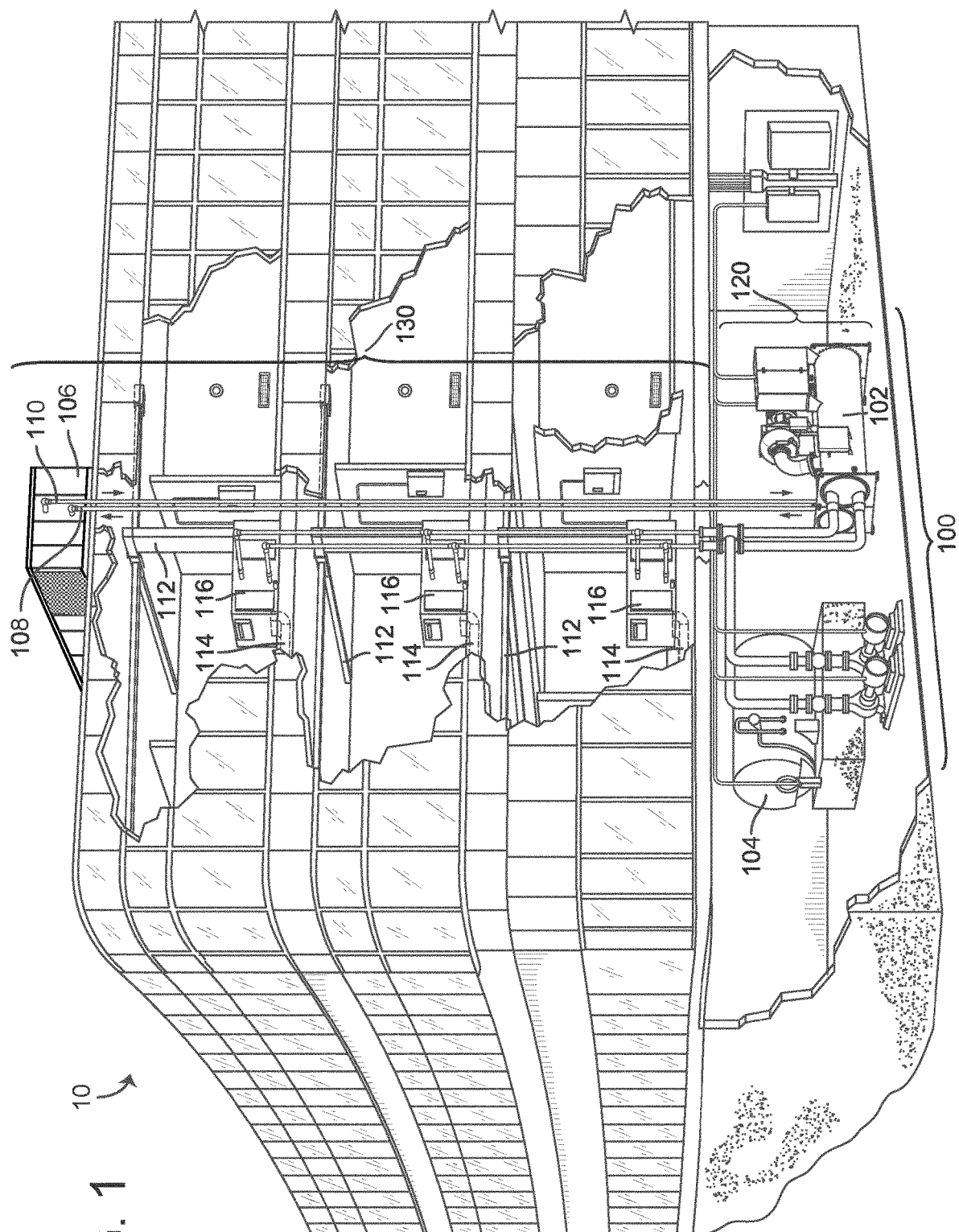
FIG. 1 is a drawing of a building equipped with a HVAC system, according to an exemplary embodiment.

Referring generally to the FIGURES, systems and methods for string mapping are shown, according to various exemplary embodiments. In some embodiments, a building system can be configured to map points of a building represented as acronyms of a string into tags. The tags can be standard names of the various points. In some embodiments, the building system is configured to utilize models that use string sentence context to translate an acronym into a tag instead of relying only on characters of the acronym.

In some cases, a many to many relationship may exist between acronyms and the tags. For example, one acronym may map to different tags, e.g., "TRM" could map to "Thermostat" or "Temperature Measurement." Likewise, multiple acronyms could map to the same tag, e.g., "BL" or "BLD" could both map to "Building." This may be due to the fact that the acronyms may be generated manually by a user instead of defined according to a standard acronym set. To handle the many to many mapping, the sentence context provided by the models discussed herein allows the models to handle the many to many mapping by considering the placement of an acronym within a string (e.g., where in the string the acronym is located, towards the beginning or towards the end), other acronyms within the string (e.g., neighboring acronyms), length of the string, etc.

In some embodiments, the building system is configured to utilize statistical modelling methods such a Conditional Random Field (CRF) and/or deep learning methods such as Long-Short Term Memory Units (LSTMs) to learn context for an acronym. Some models may translate acronym strings with varying accuracy based on the amount of available training data. In some embodiments, the building system is configured to select between various models (e.g., a CRF model and/or a LSTM model) based on training data quantity available.

Mapping with the CRF and/or LSTM model can allow for the translation of operator defined acronym strings into meaningful expansions. The expansions can form a standardized naming conventions for legacy buildings. Based on the standardized naming convention, various analytic or control engines can be built that can execute to generate outputs and/or operate building equipment. For example, applications such as building energy optimization applications, device localization applications, device interconnectivity relationship establishment applications, visualization applications, etc.

In some embodiments, the building system is configured to selecting training data for training one or more models by clustering data (e.g., particular acronyms, strings, string sub-portions, etc.) based on similarly level for user annotation. The selection can result in a small training dataset that accurately represents all data that is to be mapped. By clustering similar strings together, a user can provide annotations for one or more representative strings of the various clusters. This can reduce manual efforts in ground truth generation. In some embodiments, the building system is configured to group points with similar metadata features together first. Once the points are grouped, the building system is configured to merge clusters that are similar to each other.

In some embodiments, the tags are defined according to a BRICK schema. Translating the strings into the BRICK tags can be used by the building system to generate BRICK data. The modeling techniques can be used in the schema mapping systems and methods described in U.S. patent application Ser. No. 16/663,623 filed Oct. 25, 2019, the entirety of which is incorporated by reference herein. Furthermore, details regarding BRICK can be found in the Publication "Brick: Towards a Unified Metadata Schema For Buildings" to Balaji et al., which is incorporated by reference herein in its entirety.

Building Management System and HVAC System

Referring now to FIG. 1, an exemplary building management system (BMS) and HVAC system in which the systems and methods of the present invention can be implemented are shown, according to an exemplary embodiment. Referring particularly to FIG. 1, a perspective view of a building 10 is shown. Building 10 is served by a BMS. A BMS is, in general, a system of devices configured to control, monitor, and manage equipment in or around a building or building area. A BMS can include, for example, a HVAC system, a security system, a lighting system, a fire alerting system, and/or any other system that is capable of managing building functions or devices, or any combination thereof.

The BMS that serves building 10 includes an HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 can provide a heated or chilled fluid to an air handling unit of airside system 130. Airside system 130 can use the heated or chilled fluid to heat or cool an airflow provided to building 10. An exemplary waterside system and airside system which can be used in HVAC system 100 are described in greater detail with reference to FIGS. 2-3.

HVAC system 100 is shown to include a chiller 102, a boiler 104, and a rooftop air handling unit (AHU) 106. Waterside system 120 can use boiler 104 and chiller 102 to heat or cool a working fluid (e.g., water, glycol, etc.) and can circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 can add heat to the circulated fluid, for example, by burning a combustible material (e.g., natural gas) or using an electric heating element. Chiller 102 can place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 can place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 can transfer heat between the airflow and the working fluid to provide heating or cooling for the airflow. For example, AHU 106 can include one or more fans or blowers configured to pass the airflow over or through a heat exchanger containing the working fluid. The working fluid can then return to chiller 102 or boiler 104 via piping 110.

Airside system 130 can deliver the airflow supplied by AHU 106 (i.e., the supply airflow) to building 10 via air supply ducts 112 and can provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 can receive input from sensors located within AHU 106 and/or within the building zone and can adjust the flow rate, temperature, or other attributes of the supply airflow through AHU 106 to achieve setpoint conditions for the building zone.

Figure 2:
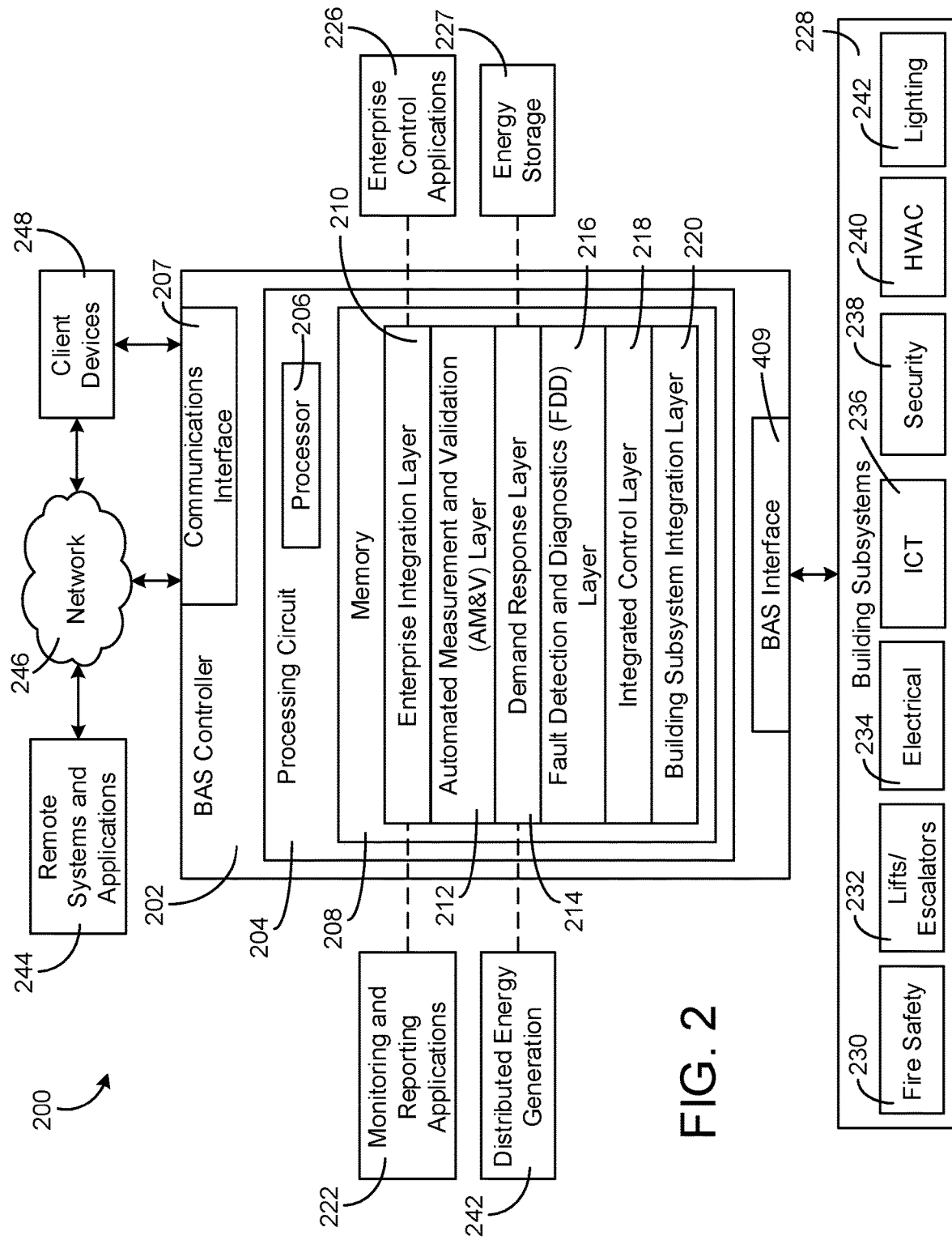
FIG. 2 is a block diagram of a building automation system (BAS) that may be used to monitor and/or control the building of FIG. 1, according to an exemplary embodiment.

Referring now to FIG. 2, a block diagram of a building automation system (BAS) 200 is shown, according to an exemplary embodiment. BAS 200 can be implemented in building 10 to automatically monitor and control various building functions. BAS 200 is shown to include BAS controller 202 and a plurality of building subsystems 228. Building subsystems 228 are shown to include a building electrical subsystem 234, an information communication technology (ICT) subsystem 236, a security subsystem 238, a HVAC subsystem 240, a lighting subsystem 242, a lift/escalators subsystem 232, and a fire safety subsystem 230. In various embodiments, building subsystems 228 can include fewer, additional, or alternative subsystems. For example, building subsystems 228 can also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 228 include a waterside system and/or an airside system. A waterside system and an airside system are described with further reference to U.S. patent application Ser. No. 15/631,830 filed Jun. 23, 2017, the entirety of which is incorporated by reference herein.

Each of building subsystems 228 can include any number of devices, controllers, and connections for completing its individual functions and control activities. HVAC subsystem 240 can include many of the same components as HVAC system 100, as described with reference to FIG. 1. For example, HVAC subsystem 240 can include a chiller, a boiler, any number of air handling units, economizers, field controllers, supervisory controllers, actuators, temperature sensors, and other devices for controlling the temperature, humidity, airflow, or other variable conditions within building 10. Lighting subsystem 242 can include any number of light fixtures, ballasts, lighting sensors, dimmers, or other devices configured to controllably adjust the amount of light provided to a building space. Security subsystem 238 can include occupancy sensors, video surveillance cameras, digital video recorders, video processing servers, intrusion detection devices, access control devices and servers, or other security-related devices.

Still referring to FIG. 2, BAS controller 266 is shown to include a communications interface 207 and a BAS interface 209. Interface 207 can facilitate communications between BAS controller 202 and external applications (e.g., monitoring and reporting applications 222, enterprise control applications 226, remote systems and applications 244, applications residing on client devices 248, etc.) for allowing user control, monitoring, and adjustment to BAS controller 266 and/or subsystems 228. Interface 207 can also facilitate communications between BAS controller 202 and client devices 248. BAS interface 209 can facilitate communications between BAS controller 202 and building subsystems 228 (e.g., HVAC, lighting security, lifts, power distribution, business, etc.).

Interfaces 207, 209 can be or include wired or wireless communications interfaces (e.g., jacks, antennas, transmitters, receivers, transceivers, wire terminals, etc.) for conducting data communications with building subsystems 228 or other external systems or devices. In various embodiments, communications via interfaces 207, 209 can be direct (e.g., local wired or wireless communications) or via a communications network 246 (e.g., a WAN, the Internet, a cellular network, etc.). For example, interfaces 207, 209 can include an Ethernet card and port for sending and receiving data via an Ethernet-based communications link or network. In another example, interfaces 207, 209 can include a Wi-Fi transceiver for communicating via a wireless communications network. In another example, one or both of interfaces 207, 209 can include cellular or mobile phone communications transceivers. In one embodiment, communications interface 207 is a power line communications interface and BAS interface 209 is an Ethernet interface. In other embodiments, both communications interface 207 and BAS interface 209 are Ethernet interfaces or are the same Ethernet interface.

Still referring to FIG. 2, BAS controller 202 is shown to include a processing circuit 204 including a processor 206 and memory 208. Processing circuit 204 can be communicably connected to BAS interface 209 and/or communications interface 207 such that processing circuit 204 and the various components thereof can send and receive data via interfaces 207, 209. Processor 206 can be implemented as a general purpose processor, an application specific integrated circuit (ASIC), one or more field programmable gate arrays (FPGAs), a group of processing components, or other suitable electronic processing components.

Memory 208 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 208 can be or include volatile memory or non-volatile memory. Memory 208 can include database components, object code components, script components, or any other type of information structure for supporting the various activities and information structures described in the present application. According to an exemplary embodiment, memory 208 is communicably connected to processor 206 via processing circuit 204 and includes computer code for executing (e.g., by processing circuit 204 and/or processor 206) one or more processes described herein.

In some embodiments, BAS controller 202 is implemented within a single computer (e.g., one server, one housing, etc.). In various other embodiments BAS controller 202 can be distributed across multiple servers or computers (e.g., that can exist in distributed locations). Further, while FIG. 2 shows applications 222 and 226 as existing outside of BAS controller 202, in some embodiments, applications 222 and 226 can be hosted within BAS controller 202 (e.g., within memory 208).

Still referring to FIG. 2, memory 208 is shown to include an enterprise integration layer 210, an automated measurement and validation (AM&V) layer 212, a demand response (DR) layer 214, a fault detection and diagnostics (FDD) layer 216, an integrated control layer 218, and a building subsystem integration later 220. Layers 210-220 is configured to receive inputs from building subsystems 228 and other data sources, determine optimal control actions for building subsystems 228 based on the inputs, generate control signals based on the optimal control actions, and provide the generated control signals to building subsystems 228 in some embodiments. The following paragraphs describe some of the general functions performed by each of layers 210-220 in BAS 200.

Enterprise integration layer 210 can be configured to serve clients or local applications with information and services to support a variety of enterprise-level applications. For example, enterprise control applications 226 can be configured to provide subsystem-spanning control to a graphical user interface (GUI) or to any number of enterprise-level business applications (e.g., accounting systems, user identification systems, etc.). Enterprise control applications 226 can also or alternatively be configured to provide configuration GUIs for configuring BAS controller 202. In yet other embodiments, enterprise control applications 226 can work with layers 210-220 to optimize building performance (e.g., efficiency, energy use, comfort, or safety) based on inputs received at interface 207 and/or BAS interface 209.

Building subsystem integration layer 220 can be configured to manage communications between BAS controller 202 and building subsystems 228. For example, building subsystem integration layer 220 can receive sensor data and input signals from building subsystems 228 and provide output data and control signals to building subsystems 228. Building subsystem integration layer 220 can also be configured to manage communications between building subsystems 228. Building subsystem integration layer 220 translate communications (e.g., sensor data, input signals, output signals, etc.) across a plurality of multi-vendor/multi-protocol systems.

Demand response layer 214 can be configured to optimize resource usage (e.g., electricity use, natural gas use, water use, etc.) and/or the monetary cost of such resource usage in response to satisfy the demand of building 10. The optimization can be based on time-of-use prices, curtailment signals, energy availability, or other data received from utility providers, distributed energy generation systems 224, from energy storage 227, or from other sources. Demand response layer 214 can receive inputs from other layers of BAS controller 202 (e.g., building subsystem integration layer 220, integrated control layer 218, etc.). The inputs received from other layers can include environmental or sensor inputs such as temperature, carbon dioxide levels, relative humidity levels, air quality sensor outputs, occupancy sensor outputs, room schedules, and the like. The inputs can also include inputs such as electrical use (e.g., expressed in kWh), thermal load measurements, pricing information, projected pricing, smoothed pricing, curtailment signals from utilities, and the like.

According to an exemplary embodiment, demand response layer 214 includes control logic for responding to the data and signals it receives. These responses can include communicating with the control algorithms in integrated control layer 218, changing control strategies, changing setpoints, or activating/deactivating building equipment or subsystems in a controlled manner. Demand response layer 214 can also include control logic configured to determine when to utilize stored energy. For example, demand response layer 214 can determine to begin using energy from energy storage 227 just prior to the beginning of a peak use hour.

In some embodiments, demand response layer 214 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 214 uses equipment models to determine an optimal set of control actions. The equipment models can include, for example, thermodynamic models describing the inputs, outputs, and/or functions performed by various sets of building equipment. Equipment models can represent collections of building equipment (e.g., subplants, chiller arrays, etc.) or individual devices (e.g., individual chillers, heaters, pumps, etc.).

Demand response layer 214 can further include or draw upon one or more demand response policy definitions (e.g., databases, XML files, etc.). The policy definitions can be edited or adjusted by a user (e.g., via a graphical user interface) so that the control actions initiated in response to demand inputs can be tailored for the user's application, desired comfort level, particular building equipment, or based on other concerns. For example, the demand response policy definitions can specify which equipment can be turned on or off in response to particular demand inputs, how long a system or piece of equipment should be turned off, what setpoints can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 218 can be configured to use the data input or output of building subsystem integration layer 220 and/or demand response later 214 to make control decisions. Due to the subsystem integration provided by building subsystem integration layer 220, integrated control layer 218 can integrate control activities of the subsystems 228 such that the subsystems 228 behave as a single integrated supersystem. In an exemplary embodiment, integrated control layer 218 includes control logic that uses inputs and outputs from a plurality of building subsystems to provide greater comfort and energy savings relative to the comfort and energy savings that separate subsystems could provide alone. For example, integrated control layer 218 can be configured to use an input from a first subsystem to make an energy-saving control decision for a second subsystem. Results of these decisions can be communicated back to building subsystem integration layer 220.

Integrated control layer 218 is shown to be logically below demand response layer 214. Integrated control layer 218 can be configured to enhance the effectiveness of demand response layer 214 by enabling building subsystems 228 and their respective control loops to be controlled in coordination with demand response layer 214. This configuration can reduce disruptive demand response behavior relative to conventional systems. For example, integrated control layer 218 can be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 218 can be configured to provide feedback to demand response layer 214 so that demand response layer 214 checks that constraints (e.g., temperature, lighting levels, etc.) are properly maintained even while demanded load shedding is in progress. The constraints can also include setpoint or sensed boundaries relating to safety, equipment operating limits and performance, comfort, fire codes, electrical codes, energy codes, and the like. Integrated control layer 218 is also logically below fault detection and diagnostics layer 216 and automated measurement and validation layer 212. Integrated control layer 218 can be configured to provide calculated inputs (e.g., aggregations) to these higher levels based on outputs from more than one building subsystem.

Automated measurement and validation (AM&V) layer 212 can be configured to verify that control strategies commanded by integrated control layer 218 or demand response layer 214 are working properly (e.g., using data aggregated by AM&V layer 212, integrated control layer 218, building subsystem integration layer 220, FDD layer 216, or otherwise). The calculations made by AM&V layer 212 can be based on building system energy models and/or equipment models for individual BAS devices or subsystems. For example, AM&V layer 212 can compare a model-predicted output with an actual output from building subsystems 228 to determine an accuracy of the model.

Fault detection and diagnostics (FDD) layer 216 can be configured to provide on-going fault detection for building subsystems 228, building subsystem devices (i.e., building equipment), and control algorithms used by demand response layer 214 and integrated control layer 218. FDD layer 216 can receive data inputs from integrated control layer 218, directly from one or more building subsystems or devices, or from another data source. FDD layer 216 can automatically diagnose and respond to detected faults. The responses to detected or diagnosed faults can include providing an alarm message to a user, a maintenance scheduling system, or a control algorithm configured to attempt to repair the fault or to work-around the fault.

FDD layer 216 can be configured to output a specific identification of the faulty component or cause of the fault (e.g., loose damper linkage) using detailed subsystem inputs available at building subsystem integration layer 220. In other exemplary embodiments, FDD layer 216 is configured to provide "fault" events to integrated control layer 218 which executes control strategies and policies in response to the received fault events. According to an exemplary embodiment, FDD layer 216 (or a policy executed by an integrated control engine or business rules engine) can shut-down systems or direct control activities around faulty devices or systems to reduce energy waste, extend equipment life, or assure proper control response.

FDD layer 216 can be configured to store or access a variety of different system data stores (or data points for live data). FDD layer 216 can use some content of the data stores to identify faults at the equipment level (e.g., specific chiller, specific AHU, specific terminal unit, etc.) and other content to identify faults at component or subsystem levels. For example, building subsystems 228 can generate temporal (i.e., time-series) data indicating the performance of BAS 200 and the various components thereof. The data generated by building subsystems 228 can include measured or calculated values that exhibit statistical characteristics and provide information about how the corresponding system or process (e.g., a temperature control process, a flow control process, etc.) is performing in terms of error from its setpoint. These processes can be examined by FDD layer 216 to expose when the system begins to degrade in performance and alarm a user to repair the fault before it becomes more severe.

String Mapping

Figure 3:
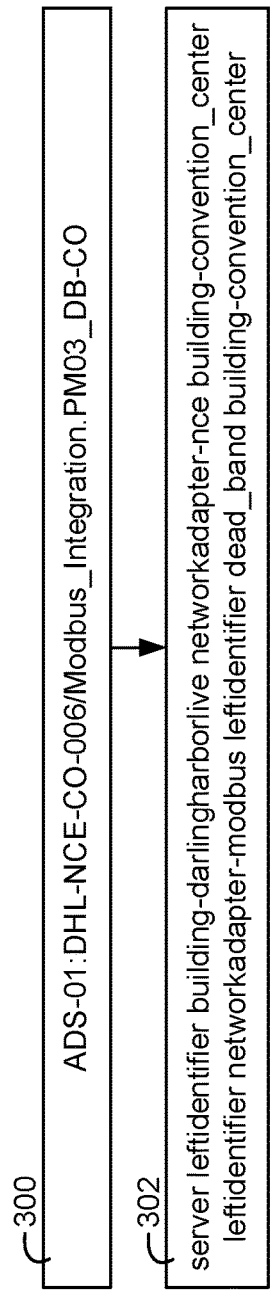
FIG. 3 is a block diagram of a string including multiple acronyms mapped to a string of multiple tags, according to an exemplary embodiment.

Referring now to FIG. 3, a block diagram of a string 300 including multiple acronyms mapped to a string 302 of multiple tags is shown, according to an exemplary embodiment. The models discussed herein can be utilized to translate strings of acronyms representing points similar to the string 300 into a set of tags, for example, the string 302. In some embodiments, the string 300 is a string of acronyms based on METASYS, BACnet, or BIM. The expansion of the string 300 into the tags can be the tags or tag-sets of BRICK.

In some embodiments, small devices such as sensors, sprinklers, low cost motors to and/or large devices such as HVAC devices, shading equipment, power generators, etc. are building entities represented in a string such as the string 300. In some embodiments, the entities are further spaces, e.g., rooms, floors, zones, buildings, etc. In some embodiments, the entities are users, operators, tenants, building managers, etc. In some cases, the acronyms used for representing the entities do not follow any standard guideline or naming convention. Instead, human operators may name device points or other entities subjectively by assigning the device points with an identifier (ID), a name, a type of the device, a location of the device, etc.

For example, for a string "2701FCU1011-13N7E OFFICE DA-T," it can be noted that "27" is a site name, "01" is a building number, "FCU101" is a device or a system name, "1-13N7E" is a device location, "OFFICE" is a space type, and "DA-T" is a discharge air temperature. The subjective naming of the string may make it difficult for some systems to map a string into tags. However, the systems and methods herein can utilize models that understand contextual information of the strings.

Figure 4:
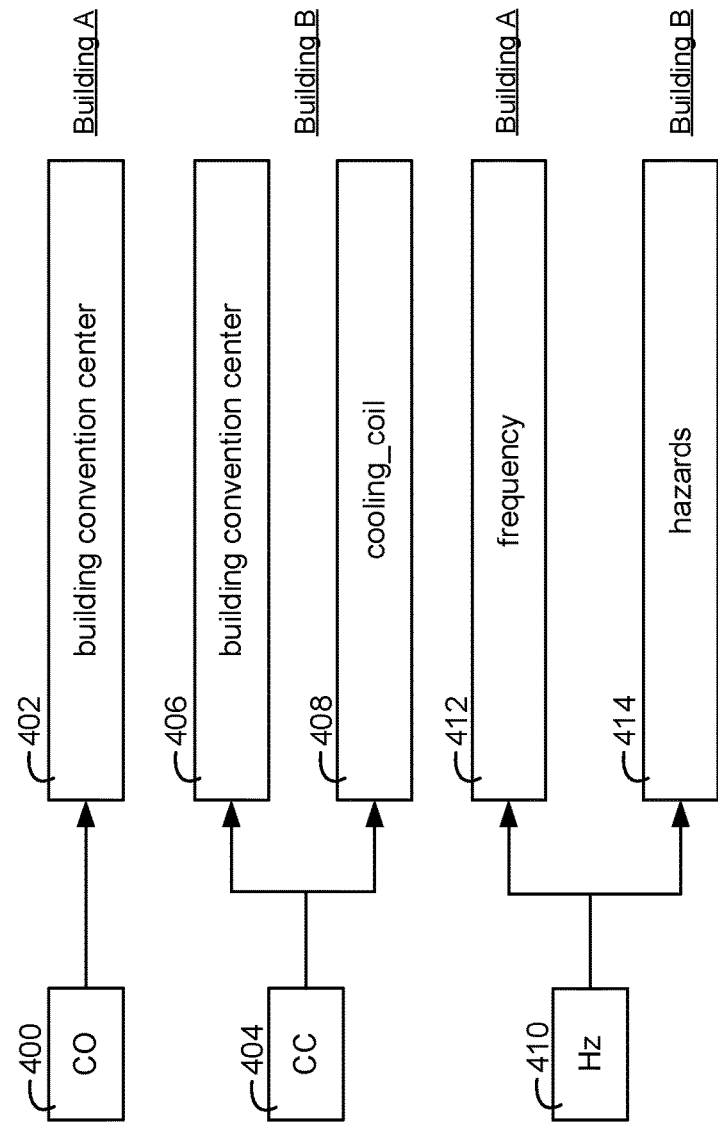
FIG. 4 is a block diagram illustrating many to many mappings between acronyms and tags, according to an exemplary embodiment.

Referring now to FIG. 4, a block diagram illustrating many to many mappings between acronyms and tags is shown, according to an exemplary embodiment. Mappings between three acronyms 400, 404, and 410, i.e., "CO," "CC," and "Hz" are shown. The acronym 400 is mapped directly to a string 402, "building convention center," for a particular building, building A. The acronym 404 is mapped to two separate strings for a building B, i.e., string 406, "building convention center" and string 408, "cooling_coil." An acronym 410, "Hz," can map to two separate strings for two separate buildings. For building A, the acronym 410 can map to the string 412, i.e., "frequency." For building B, the acronym 410 can map to the string 414, i.e., "hazards." Although the mappings are shown for different buildings, in some cases the mappings of FIG. 4 are for a single building.

As can be seen, building A and building B may use different acronyms for a string "building convention center." For the building B, an acronym "CC" can map to two separate strings, the strings 406 and 408. Furthermore, for building A and building B, the acronym 410 may map to separate strings 412 and 414 respectively. This acronym to string mapping of FIG. 4 represents a many to many relationship. Contextual acronym string data can be used by the models described herein to appropriately map acronyms to strings even when a many to many relationship exists. The models described herein can understand the context of a string of multiple acronyms that form a "sentence." Context may be neighboring acronyms, position of an acronym within a sentence, etc.

Some systems can utilize look-up tables and/or association tables, however, such mappings may not be able to handle many to many relationships. Some systems can utilize spelling correction software to translate acronyms into strings. However, acronyms such as 'CO' cannot be converted to "Building Convention Centre" as the acronym and tag do not have close association by spelling/characters. Furthermore, substring manipulation methods such as Fuzzy or Approximate string matching between an acronym and a predicted expansion using an edit distance is not accurate.

Therefore, in order to properly handle a many to many relationship, the systems described herein can be configured to utilize models that can map acronyms into tags based on contextual information of a string, e.g., based on other characters or acronyms within the strings. In some embodiments, the models can be probabilistic models. Probabilistic models may include CRF models. In some embodiments, the models can be deep learning models. Deep learning models may include LSTM sequence to sequence models.

Figure 5:
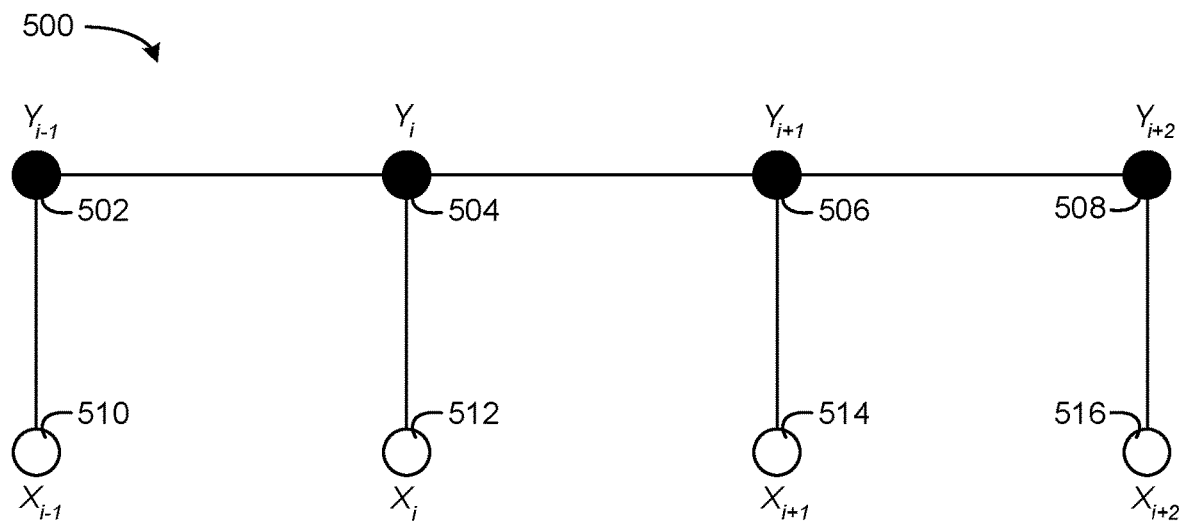
FIG. 5 is a block diagram of a conditional random field (CRF) model, according to an exemplary embodiment.

Referring now to FIG. 5, a conditional random field (CRF) model 500 is shown, according to an exemplary embodiment. The CRF model 500 can translate acronyms representing building points to tags. The CRF model 500 illustrates a model framework for building probabilistic models to segment and label sequence data. The CRF model 500 calculates a conditional probability distribution over a label sequence given an observation sequence rather than making any independence assumptions required by a Hidden Markov Model (HMM).

The CRF model 500 is an undirected graphical model whose nodes can be divided into two disjoint sets, X and Y, which are jointly distributed. The set of nodes X are represented as nodes 510-516 while the set of nodes Y are represented as the nodes 502-508. The CRF model 500 includes various edges between the nodes 502-516 representing the relationships between the various nodes 502-516. There can be any number, i, nodes of the sets X and Y. The set X is a random variable over data sequences to be labeled and Y is a random variable over corresponding label sequences. The CRF model 500, which is a discriminative framework, constructs a conditional model p(Y|X) from paired observation and label sequences, and do not explicitly model the marginal p(X).

The CRF model 500 can be mathematically defined as follows: letting G=(V,E) be a graph such that Y=(Y$_v$)$_{v\in V}$, so that Y is indexed by the vertices of G, then (X,Y) is a conditional random field, when conditioned on X, the random variables Y$_v$ obey the Markov property with respect to the graph: p(Y$_v$|X, Y$_w$, w≠v)=p(Y$_v$|X~v), where w and v are neighbors in G. In the context of point mapping, X is acronyms and Y is the corresponding expansions to be known. Greater details regarding probabilistic modeling and CRF modeling are described in Conditional Random Fields: Probabilistic Models for Segmenting and Labeling Sequence Data published on Jun. 28, 2001 to Lafferty et. al.

Figure 6:
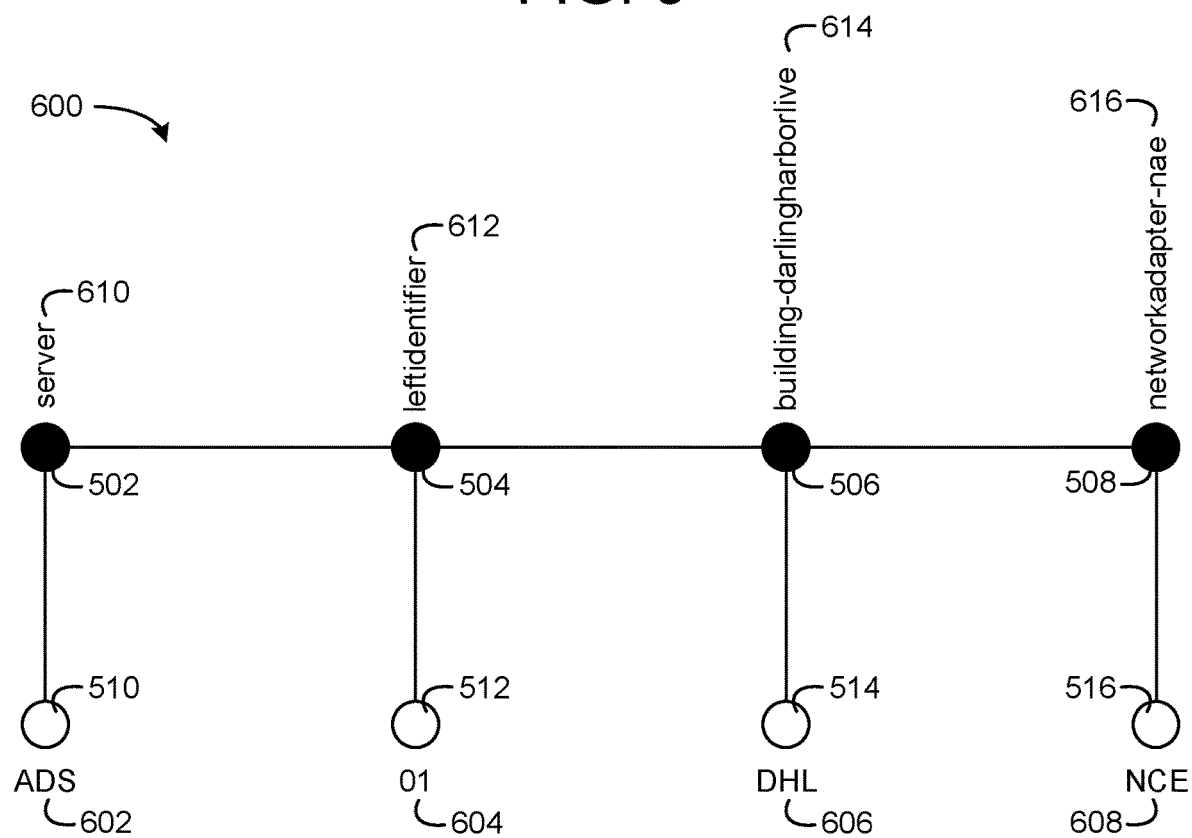
FIG. 6 is a block diagram of a CRF model mapping acronyms of a string to corresponding tags, according to an exemplary embodiment.

Referring now to FIG. 6, a block diagram of a CRF model 600 mapping acronyms of a string to corresponding tags, according to an exemplary embodiment. The CRF model 600 may be the same as, or similar to the CRF model 500. The CRF model 600 receives a string of acronyms as an input. Acronyms of the string can be divided up as acronyms 602-608 and applied as inputs to the nodes 510-516. The outputs 610-616 can be tags output via the nodes 502-508.

B-I-O (Beginning-Inside-Outside) encoding can be used for dividing up the string for input to the CRF model 600. The B-I-O encoding can identify and separate out unique acronyms from characters of a string. Some models can learn and/or identify the Beginning, the Inside, and the Outside of a text segments. For example, "ADS" is assigned as "A" to "B-server", to "I-server" and "S" to "I-server." Special characters such as the punctuations ',' and '-' if present can be assigned to "O" token. The CRF model 600 can make an assumption that the tag of a character only depends on its neighboring characters. The CRF 600 model for the character j: the jth character itself, (j−1)th character, (j−2)th character, (j+1)th character. In some embodiments, the acronyms that are applied as inputs to the CRF model 600 are based on an acronym vocabulary. Generating an acronym vocabulary is described in greater in detail with reference to FIG. 17.

Figure 7:
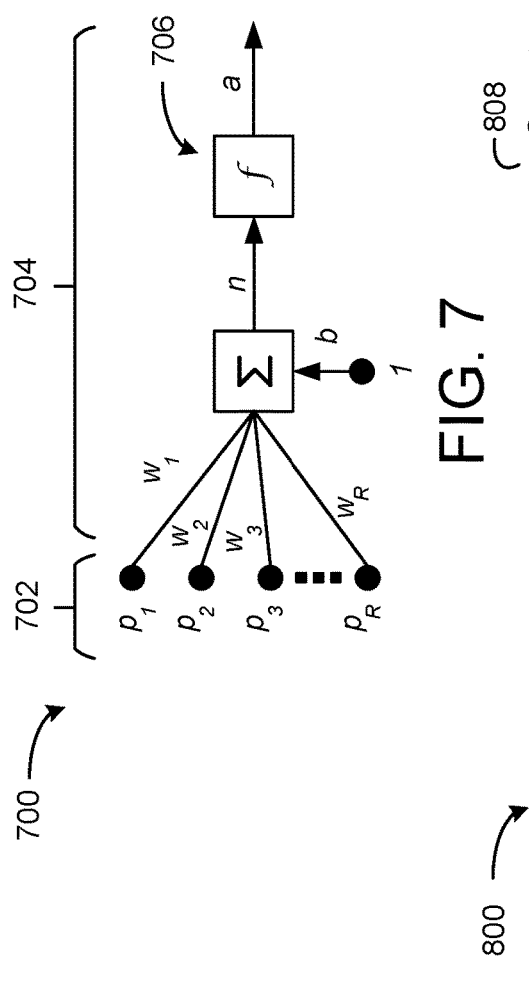
FIG. 7 is a block diagram of a neuron of a neural network, according to an exemplary embodiment.

Referring now to FIG. 7, a neuron 700 that can be used in a neural network is shown, according to an exemplary embodiment. In a neural network, many neurons 700 can be used to generate an output from an input. The neuron 700 can be configured to include one or more input signals 702 and a neuron body 704. In some embodiments, the input signals 702 are provided by a particular data source. In other embodiments, the input signals 702 are provided by a previous neural network layer having one or more neurons 700. The neuron body 704 includes a series of weights assigned to each of the input signals 702 by which each input signal is multiplied in the neural network. The neuron body 704 also includes a summation operation which takes the product all input signals 702 and their associated weights and add them together. Furthermore, a single bias value, b, is assigned to each neuron 700 and added to the sum of all weighted input signals 702. The weights and bias values can vary between the neurons 700 used in a neural network. In some embodiments, the summation operation is defined as follows:

$$n = b + \Sigma_{x=1}^{R}(p_x \times w_x)$$

The output of the summation operation and bias value is denoted as n in FIG. 7. The output, n, may then be provided as input to an activation function 706. The activation function 706 is a function applied to n for each neuron 700 in order to adjust the neuron activation level into some that range of values. In some embodiments, the activation function 706 is applied to the output, n, to transform the output into some real number between zero and one. In some embodiments, the activation function 706 is configured as a sigmoid function having the following form:

$$a = \frac{1}{1 + e^x}$$

In another embodiment, the activation function 706 could be configured as a rectified linear unit function (ReLU) having the following form:

$$a = \max(0, x)$$

In other embodiments, the activation function 706 could be some other linear or nonlinear function. The activation function 706 can be configured to create an activation level, a, within the desired range of real numbers. In some embodiments, the activation level of each neuron 700 is then provided as an input signal 702 to the neurons 700 of the next layer of the neural network. In some embodiments, the activation function 706 can be a tanh activation.

Figure 8:
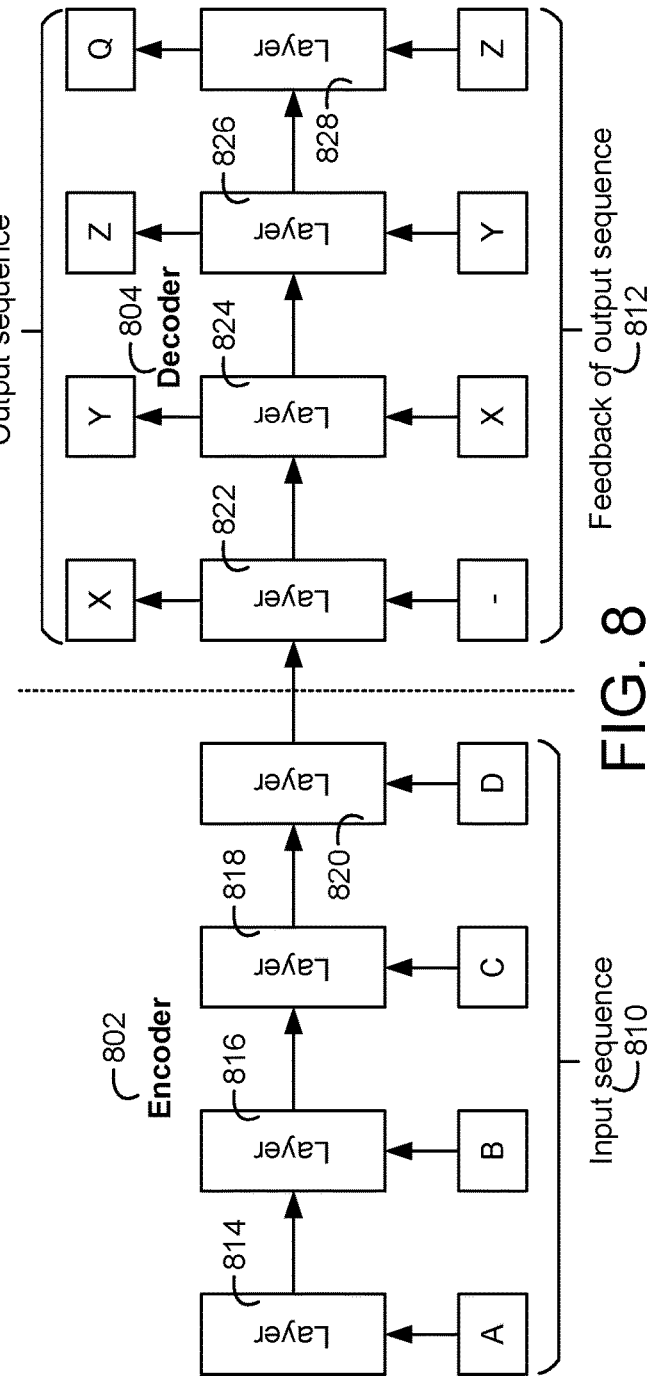
FIG. 8 is a block diagram of a long-short term memory sequence to sequence (LSTM S2S) neural network, according to an exemplary embodiment.

Referring now to FIG. 8, a LSTM S2S neural network 800 is shown, according to an exemplary embodiment. An LSTM is a type of RNN while S2S is an architectural form of neural network. The LSTM S2S neural network 800 is made of two main components, an encoder 802 and a decoder 804. The encoder 802 can receive an input sequence, i.e., sequence 810. The decoder 404 can generate the output sequence 808. Furthermore, the decoder can receive feedback of the output sequence 812 into the decoder 804 where the sequence 812 is at least a portion of the sequence 808.

The encoder 802 can be configured to transform a sequence into a vector which is passed to the decoder 804. More specifically, the encoder 802 can be configured to generate the vector based on the sequence 810. The decoder 804 can be configured to generate a sequence based on the vector of the encoder 802 (as well as other inputs). Both the encoder 802 and the decoder 804 can include multiple layers, i.e., layers 814-828. Each of the layers 814-828 can be LSTM layers and/or deep LSTM layers. Exemplary types of RNN layers are described with reference to FIGS. 9-10. Other types of layers may be GRU neural network layers.

As illustrated by FIG. 8, the input to layer 824 is the value "X" of the sequence 812 which is the output of the layer 822. Similarly, the output of the layer 824, "Y," is the input to the layer 826. Furthermore, the output of the layer 826, "Z," is the input of the layer 828. The data point can be a control point, an ambient condition data point (e.g., outdoor air temperature, humidity, air quality, etc.), energy usage of a campus or building, etc.

Figure 9:
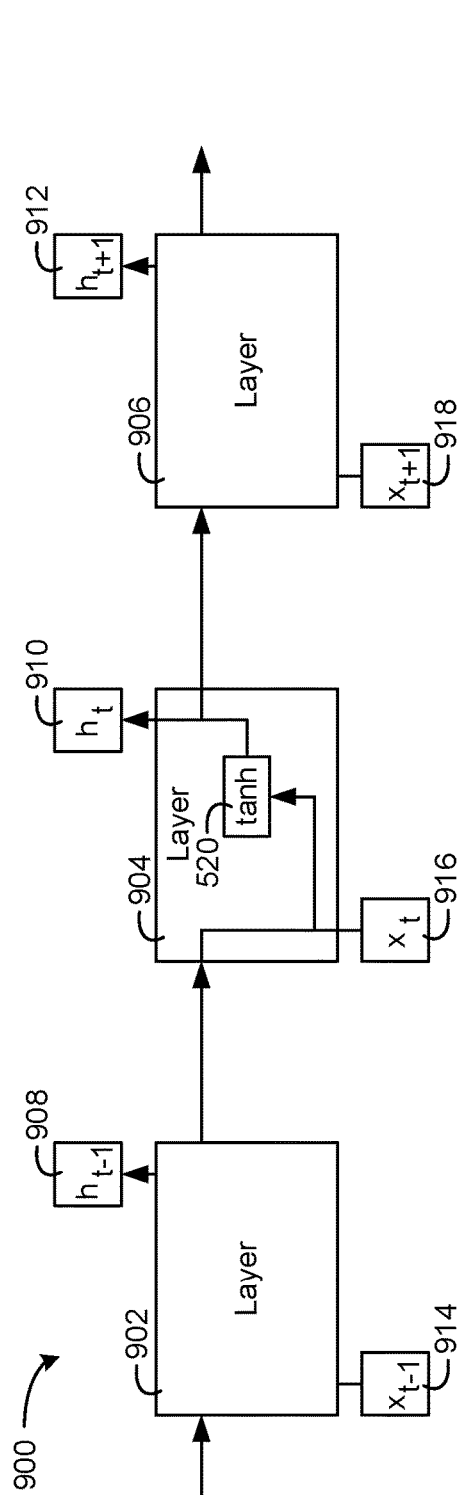
FIG. 9 is a block diagram of layers of a recurrent neural network (RNN), according to an exemplary embodiment.

Referring now to FIG. 9, layers of a RNN 900 are shown, according to an exemplary embodiment. The RNN 900 includes layers 902-906. The architecture of each of the layers 902-906 may be the same. The architecture is illustrated by the layer 904. Each of the layers 902-906 may receive an input, i.e., inputs 914-918 while each of the layers 902-906 can also generate an output 908-912. Each of the layers 902-906 may be chained together such that the output of each layer is fed into the next layer. In layer 904, the output of the layer 902 (the output 908) is fed into the layer 904 and is concatenated with the input 916. The result of the concatenation is passed through a tanh activation 920 which is subsequently passed out of the layer 904 to the layer 906, i.e., the output 910.

The architecture of the layers 902-906 allow for the RNN 900 to have memory, i.e., have persistence of outputs. However, while the RNN 900 may include memory, the memory may not be long term, i.e., the RNN 900 suffers from the vanishing gradient problem and encounters difficulty in learning long term. To address the effects of long term memory, an LSTM can be utilized.

Figure 10:
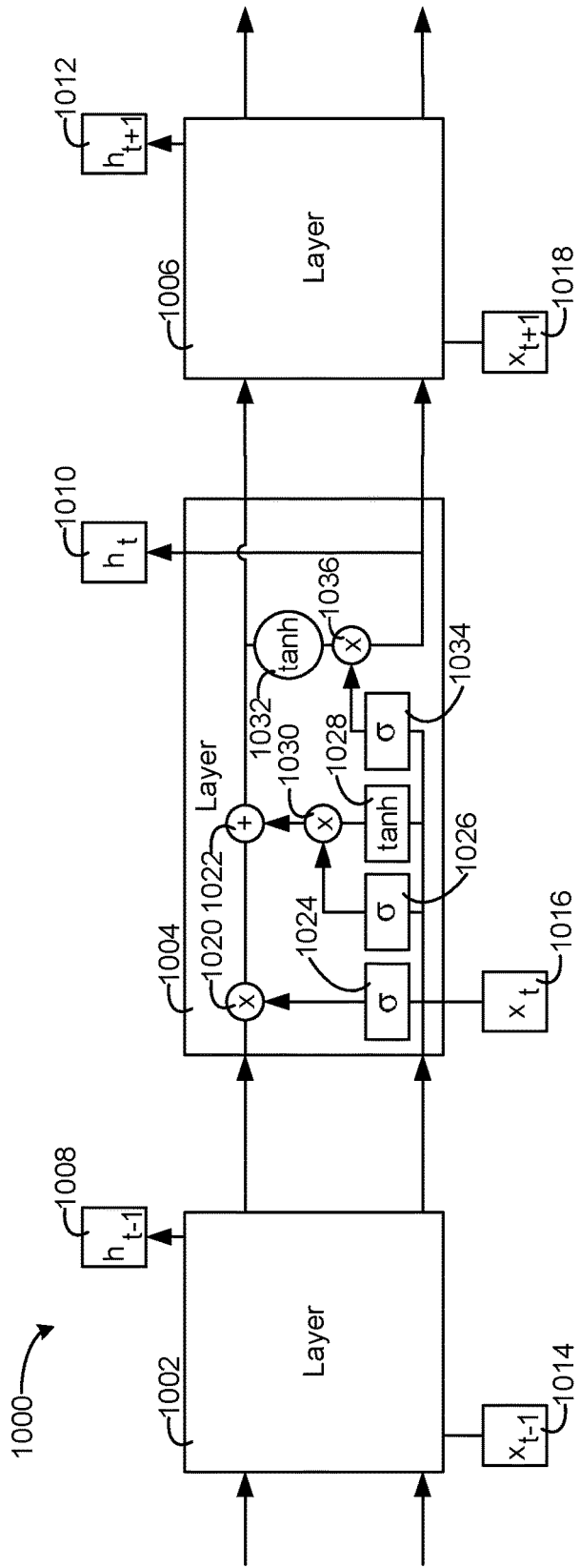
FIG. 10 is a block diagram of layers of a LSTM neural network, according to an exemplary embodiment.

Referring now to FIG. 10, a LSTM neural network 1000 is shown, according to an exemplary embodiment. The LSTM neural network 1000 includes layers 1002-1006. The architecture of each of the layers 1002-1006 may be the same. The architecture is illustrated by the layer 1004. Each of the layers 1002-1006 may receive an input, i.e., inputs 1014-1018 while each of the layers 1002-1006 can also generate an output 1008-1012. Each of the layers 1002-1006 may be chained together such that the outputs of each layer is fed into the next layer. The layer 1004 can include neural network layers 1024, 1026, 1028, and 1034 which are shown as tanh and sigmoid activations respectively. Furthermore, the layer 1004 includes pointwise operations 1020, 1022, 1030, 1032, and 1036 which represent multiplication, addition, and tanh variously. Where multiple lines between layers come together in the layer 1004 represents concatenation. Greater details on RNN and LSTM networks and layer construction can be found in the publication "Understanding LSTM Networks" by Christopher Olah published on Aug. 27, 2015, the entirety of which is incorporated by reference herein.

Figure 11:
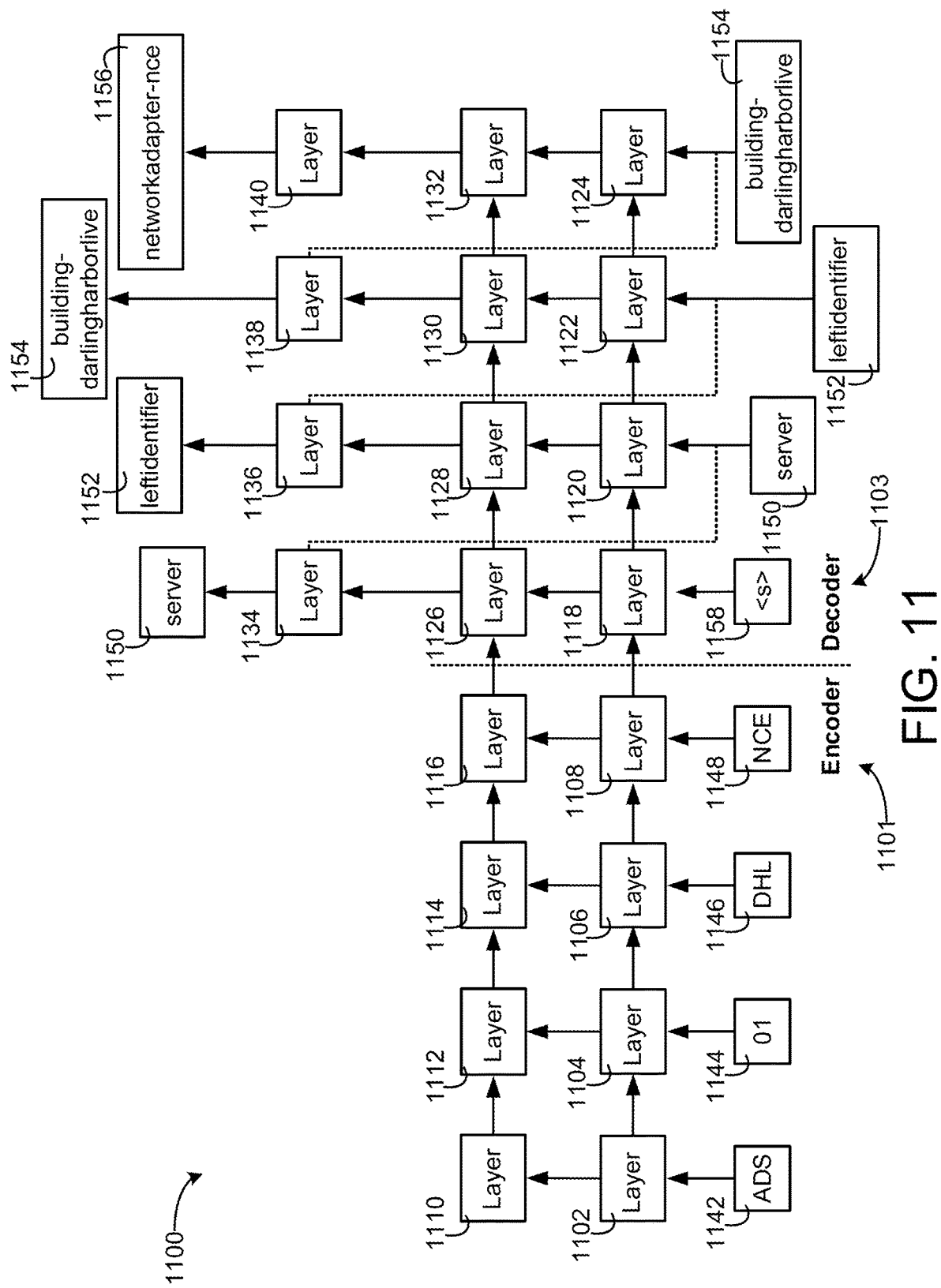
FIG. 11 is a block diagram of an LSTM S2S neural network mapping acronyms representing building entities to tags, according to an exemplary embodiment.

Referring now to FIG. 11, a block diagram of an LSTM S2S neural network 1100 mapping acronyms representing building entities to tags is shown, according to an exemplary embodiment. The LSM S2S neural network 1100 can be similar to the LSTM S2S neural networks described with reference to FIG. 8 and FIG. 10. The encoder 1101 can be configured to encode the acronyms 1142-1148 and pass the encoded acronyms to the decoder 1103. The decoder 1103 can decode the encoded acronyms into the tags 1150-1156. At least a portion of the output tags 1150-1156 (i.e., the tags 1150-1154) can be fed as input back into the decoder 1103. The decoder 1103 can operate based on the feedback to output the tags 1150-1156.

The encoder 1101 includes multiple layers 1102-1116. Furthermore, the decoder 1103 includes layers 1118-1140. The layers 1102-1140 can each be the same as, or similar to, the LSTM layers described in FIG. 10. However, in some embodiments, the layers 1102-1140 can be the same as or similar to the tanh layer as described in FIG. 9. In some embodiments, the layers 1102-1116 can be any type of neural network RNN layer.

A user can understand a word of a sentence based on their understanding of previous words in the sentence. This type of context learning has benefits such as associating nearby words. The LSTM S2S neural network 1100 can be configured to utilize context, i.e., other acronyms in a string, to classify a particular acronym. For example, for a string "AHU 01," by associating "01" with "AHU," the LSTM S2S neural network 1100 can predict "01" as "leftidentifier."

The memory cells of the LSTM S2S neural network 1100 can store information and each cell can transmits the information that it knows already to the successive cells. This provides the LSTM S2S neural network 1100 with contextual information for translating the acronyms to strings.

Figure 12:
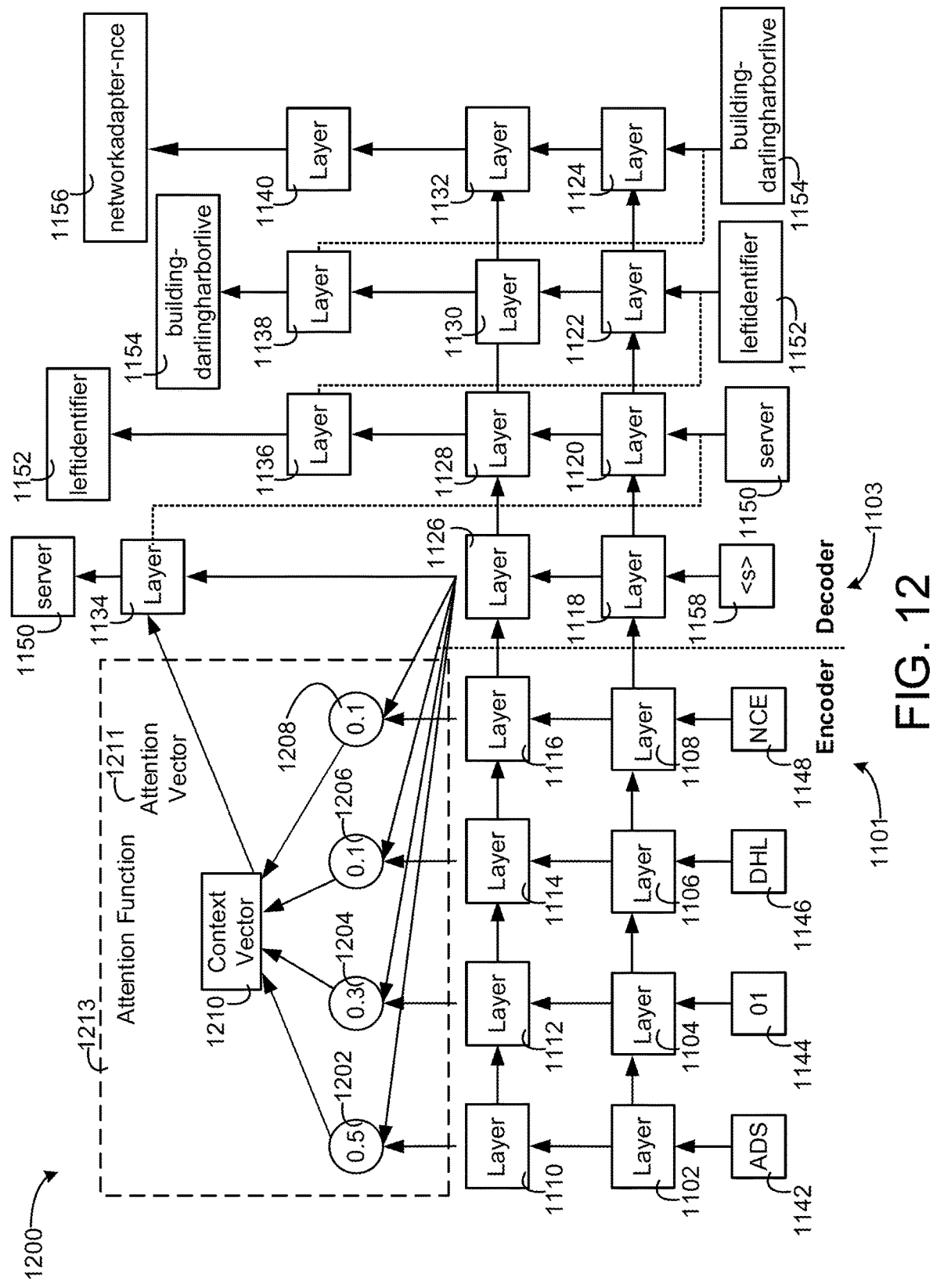
FIG. 12 is a block diagram of an LSTM S2S neural network with a context vector mapping acronyms representing building points to tags, according to an exemplary embodiment.

Referring now to FIG. 12, a block diagram of an LSTM S2S neural network 1200 is shown with an attention function 1213 mapping the acronyms 1142-1148 representing building points to tags 1150-1156, according to an exemplary embodiment. In FIG. 12, the encoder 1101 includes the attention function 1213. The attention function 1213 represents variable length acronyms in a fixed length vector, a context vector 1210.

In some cases, the LSTM S2S neural network 1100 performs with low accuracy, for example, if an acronym sentence input into the LSTM S2S neural network 1100 is long (e.g., includes more than a predefined amount of acronyms). This is due to the fact that the encoder 1102 compresses the acronym sentence (e.g., the acronyms 1142-1148) heavily during encoding causing errors at the end of the expansion sentence (e.g., the tags 1150-1156) while decoding by the decoder 1103. However, the errors resulting from compression can be resolved with an attention function 1213. The attention function 1213 utilizes a weighting mechanism for context learning that allows for long acronym sentences to be expanded into tags.

For a long acronym sentence, a part of the sentence can have semantic and syntactic context for the current expansion word that the LSTM S2S neural network 1200 is predicting (e.g., the tag 1150) for the prediction to be correct. Therefore, the attention function 1213 can be configured to provide importance to such subsequence context while the LSTM S2S neural network 1200 is making predictions by assigning higher weights to nearby acronyms and gradually lowering the weights as the LSTM S2S neural network 1200 moves outward of the acronym sentence. For example, in FIG. 12, an attention weight 1202 is an exemplary value of 0.5 while the attention weights 1204-1208 gradually decrease, i.e., are exemplary values 0.3, 0.1, and 0.1. The LSTM S2S 1200 including the attention function 1213 can improve expansion prediction effect as compared to the LSTM S2S 1100.

The attention function 1213 can be configured to compare the current target hidden state $h_t$ (the output of the layer 1126), with all the source states $h_s$ (the outputs of the layers 1110-1116) to derive attention scores. The attention scores can be determined as:

$$\text{score}(h_t, \bar{h}_s) = \begin{cases} h_t^T W \bar{h}_s & \text{[Luong's multiplicative style]} \\ v_a^T \tanh(W_1 h_t + W_2 \bar{h}_s) & \text{[Bahdanhau's additive style]} \end{cases}$$

The attention function 1213 can be configured to apply a softmax function on the attention scores and compute the attention weights 1202-1208, one for each encoder layer (the layers 1110-1116). The attention weights 1202-1208 can be determines as:

$$\alpha_{ts} = \frac{\exp(\text{score}(h_t, \bar{h}_s))}{\sum_{s'=1}^{S} \exp(\text{score}(h_t, \bar{h}_{s'}))}$$

The attention function 1213 can be configured to compute the context vector 1210 with the attention weights 1202-1208 as the weighted average of the source states (the outputs of the layers 1110-1116). The context vector 1210 can be determined as:

$$c_t = \sum_s \alpha_{ts} \bar{h}_s$$

The attention function 1213 can be configured to combine the context vector with the current target hidden state (the output of the layer 1226) to yield the attention vector 1211. The attention function 1213 is configured to project the attention vector 1211 on a target vocabulary to weight the target vocabulary, i.e., the possible tags that the layer 1134 can output. The attention vector 1211 can be determined as:

$$\alpha_t = f(c_t, h_t) = \tanh(W_c[c_t; h_t])$$

Figure 13:
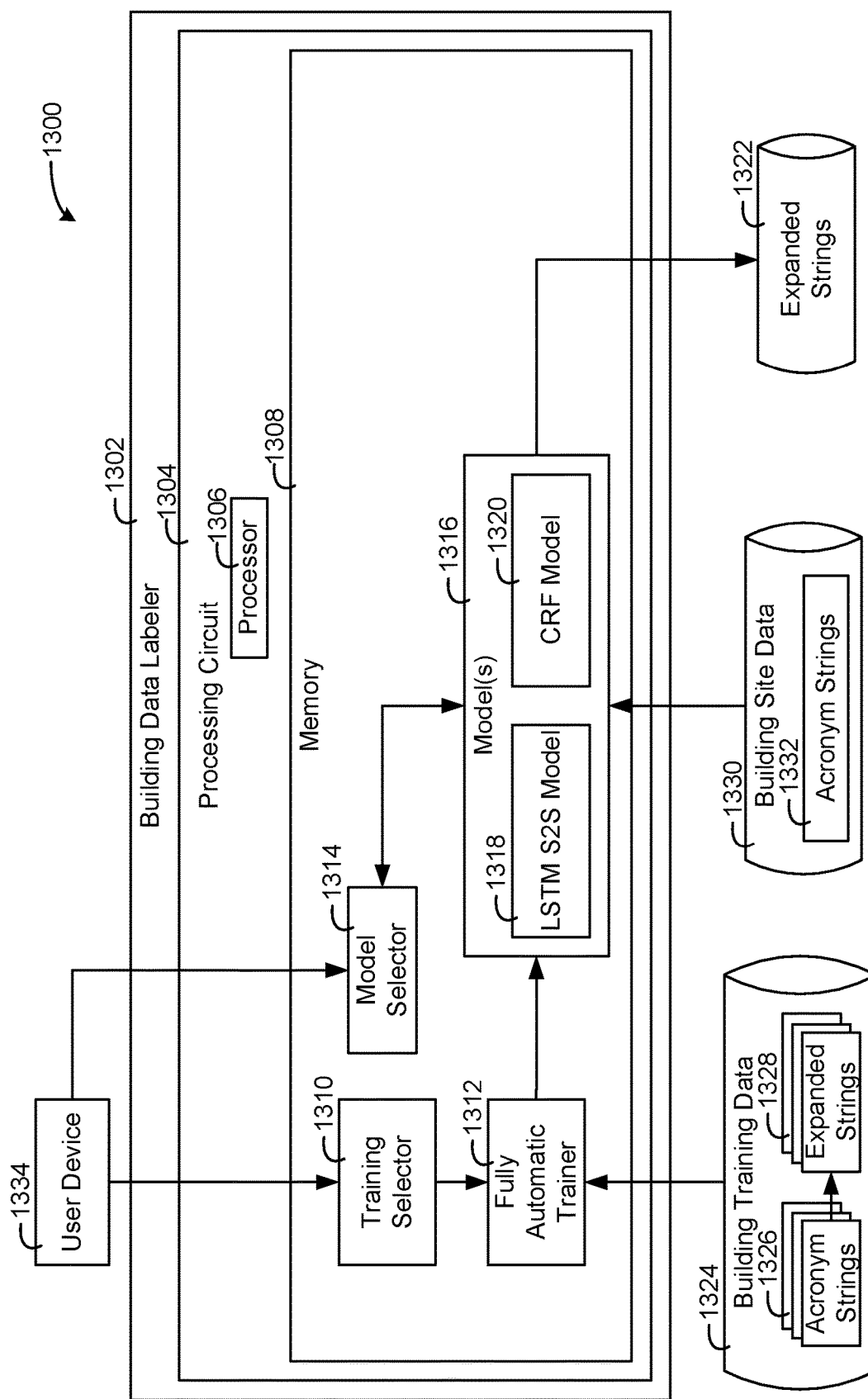
FIG. 13 is a block diagram of a building data labeler configured to perform fully automatic training of an LSTM model or a CRF model and map acronyms representing building points to tags based on the trained LSTM model or the trained CRF model, according to an exemplary embodiment.

Referring now to FIG. 13, a block diagram of a system 1300 including a building data labeler 1302 is shown, the building data labeler 1302 configured to perform fully automatic training of an LSTM model or a CRF model and map acronyms representing building points to tags based on the trained LSTM model or the trained CRF model, according to an exemplary embodiment. In some embodiments, the building data labeler 1302 is configured to train models for acronym to expansion translation either fully automatically or semi-automatically. The fully automatic training is described in FIG. 13 while the semi-automatic training is described in FIG. 14.

The fully automatic training may require a significant amount of training data but the translation for a new building is fully automatic, i.e., none of the data of a particular building, e.g., the building data site data 1330, needs to be manually labeled for training the model. The building data labeler 1302 can be configured to train the model with ground truth of acronyms and expansion pairs, e.g., the acronym strings 1326 and corresponding expanded strings 1328. The acronym strings 1326 may be the same as or similar to the string 300 while the expanded strings 1328 may be the same as or similar to the string 302. In some embodiments, the building training data 1324 automatically receive the acronym strings 1326 from various buildings while the expanded strings 1328 are manually labelled data by a user.

The system 1300 includes a user device 1334, the building data labeler 1302, building training data 1324, building site data 1330, and expanded strings 1322. The building data labeler 1302 can receive a selectin to perform fully automatic training from a user via the user device 1334. Based on the user selection, the building data labeler 1302 can train a translation model based on the building training data. With the trained model, the building data labeler 1302 can be configured to translate acronym strings 1332 of the building site data 1330 into the expanded strings 1322. In some embodiments, the building data labeler 1302 can be similar to the BAS controller 202. In some embodiments, the BAS controller 202 can be configured to perform the operations of the building data labeler 1302.

The building data labeler 1302 includes a processing circuit 1304. The processing circuit 1304 includes a processor 1306 and a memory 1308. The processor 1306 can be implemented as a general purpose processor, an application specific integrated circuit (ASIC), one or more field programmable gate arrays (FPGAs), a group of processing components, or other suitable electronic processing components.

The memory 1308 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. The memory 1308 can be or include volatile memory or non-volatile memory. The memory 1308 can include database components, object code components, script components, or any other type of information structure for supporting the various activities and information structures described in the present application. According to an exemplary embodiment, the memory 1308 is communicably connected to the processor 1306 via the processing circuit 1304 and includes computer code for executing (e.g., by the processing circuit 1304 and/or the processor 1306) one or more processes described herein.

The memory 1308 includes a training selector 1310, a fully automatic trainer 1312, a model selector 1314, and model(s) 1316. The training selector 1310 is configured to receive a selection from the user device 1334 to train the models 1316 to generate the trained models 1316 with a fully automatic or semi-automatic training method. The fully automatic trainer 1312 is configured to perform fully automatic training, in some embodiments. The semi-automatic training method is described with greater reference to FIG. 14. The user device 1334 may be similar to, or the same as, the client devices 248 described with reference to FIG. 2.

In some embodiments, the building data labeler 1302 can utilize the Google Neural Machine Translation engine to perform training on the LSTM S2S model 1318 and/or generate inferences with the LSTM S2S model 1318. The Google Neural Machine Translation engine, in some cases, utilizes python programming. In some embodiments, the Google Neural Machine Translation engine utilizes Keras as a front-end and Tensorflow as a backend for implementing the LSTM S2S model 1318.

The fully automatic trainer 1312 is configured to receive the building training data 1324, i.e., the acronym stings 1326 and the expanded string 1328. Each of the acronym strings 1326 may be linked to one of the expanded strings 1328. The expanded stings 1328 may represent a translation of one of the acronym strings 1326. The acronym strings 1326 an be received from various building systems while the expanded strings 1328 can be generated by a user based on each of the acronym strings 1326. The expanded strings 1328 can be generated by a user and provided by the user device 1334.

The fully automatic trainer 1312 can be configured to train at least one of the models 1316 based on the building training data 1324. The fully automatic trainer 1312 can train the LSTM S2S model 1318 and/or the CRF model 1320. The LSTM S2S model 1318 may be the same as or similar to the LSTM S2S model 1100 or the LSTM S2S model 1200. The CRF model 1320 can be the same as or similar to the CRF models 500 or 600 as described with reference to FIG. 5 and FIG. 6 respectively.

For training the LSTM S2S model 1318, the fully automatic trainer 1312 can be configured to perform one or multiple different training algorithms, e.g., one-dimensional optimization, multidimensional optimization (e.g., gradient descent, Newton's method, conjugate gradient, quasi Newton, Levenberg Marquardt, etc.), and/or any other optimization algorithm. For training the CRF model 1320, the fully automatic trainer 1312 can be configured to perform gradient descent, the quasi-Newton method, and/or any other training algorithm.

The model selector 1314 can be configured to select between the LSTM S2S model 1318 and the CRF model 1320. Based on the selection, the fully automatic trainer 1312 can train the selected model and generate the expanded strings 1322 from the acronym strings 1332 based on the selected model. In some embodiments, the model selector 1314 can be configured to select between the LSTM S2S model 1318 and the CRF model 1320 based on a size of the building training data 1324. The size may be a number of the acronym strings 1326, a number of acronyms in the acronym strings 1326, a number of characters in the acronym strings 1326, etc.

Figure 18:
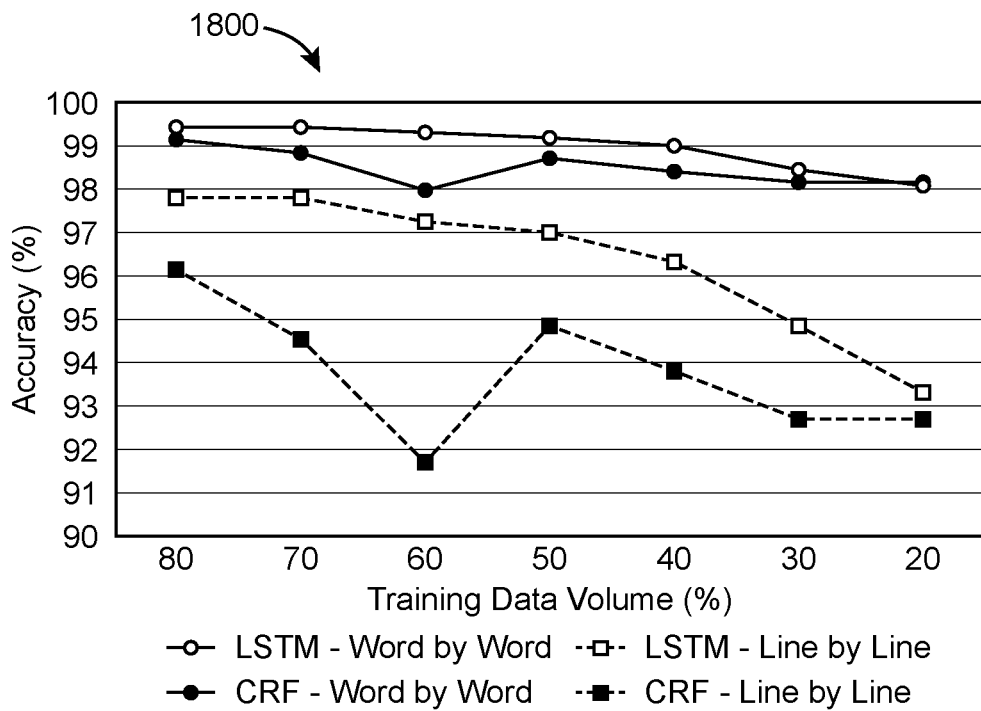
FIG. 18 is a chart illustrating word-by-word and line-by-line accuracy for large training data sets for the CRF model and the LSTM model, according to an exemplary embodiment.
Figure 19:
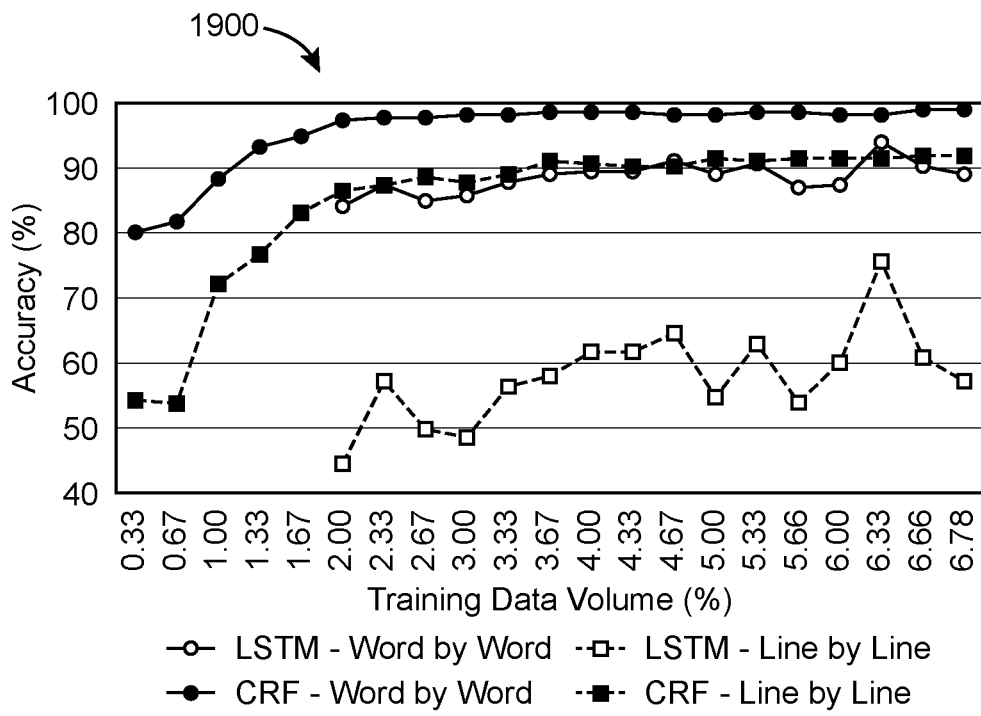
FIG. 19 is a chart illustrating word-by-word and line-by-line accuracy for small training data sets for the CRF model and the LSTM model, according to an exemplary embodiment.

Some models may perform better for larger or small data sets. For example, for a large data set, a size greater than a predefined amount, the model selector 1314 can select the LSTM S2S model 1318. For a small data set, a data set with a size less than the predefined amount, the model selector 1314 can select the CRF model 1320. Examples of the performance of LSTM and CRF models for various data set sizes are shown in FIGS. 18 and 19.

Figure 14:
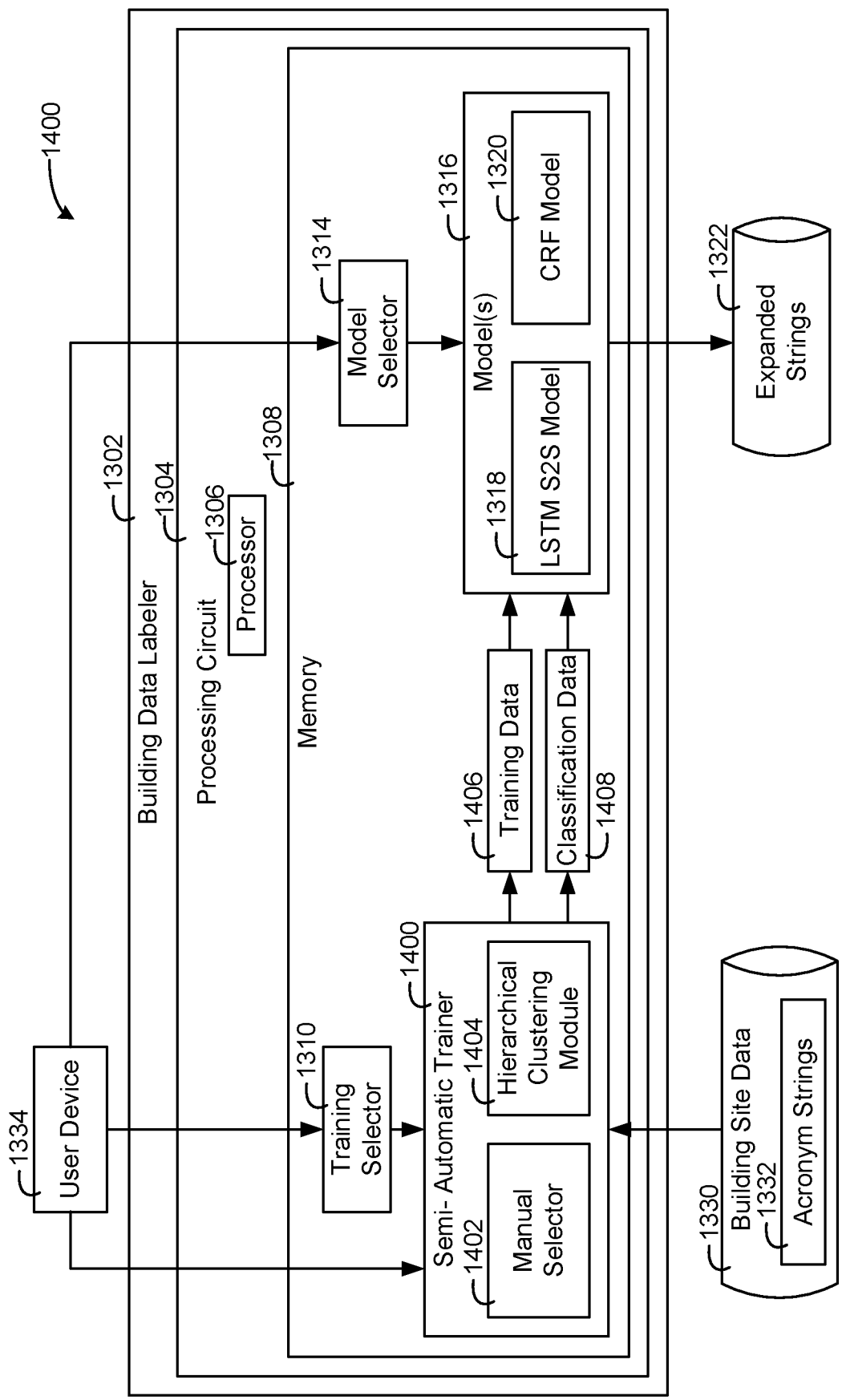
FIG. 14 is a block diagram of the building data labeler of FIG. 13 configured to perform semi-automatic training of the LSTM model or the CRF model and map acronyms representing building points to tags based on the trained LSTM model or the trained CRF model, according to an exemplary embodiment.

Referring now to FIG. 14, is a block diagram of a system 1400 including the building data labeler 1302 of FIG. 13 is shown, the building data labeler 1302 is configured to perform semi-automatic training of the LSTM S2S model 1318 or the CRF model 1320 and map acronyms representing building entities to tags based on the trained LSTM S2S model 1318 or the trained CRF model 1320, according to an exemplary embodiment.

The memory 1308 includes a semi-automatic trainer 1400. The semi-automatic trainer 1400 can be configured to train the models 1316 when no prior training data is available, i.e., the building data labeler 1302 is being deployed for a site and has not yet been trained. In some embodiments, the semi-automatic trainer 1400 can train the models 1316 with minimal training data from a new building, e.g., the building site data 1330.

The semi-automatic trainer 1400 can be configured to receive acronym strings 1332 of the building site data 1330 and divide the acronym strings 1332 into the training data 1406 and the classification data 1408. The training data 1406 can be used by the semi-automatic trainer 1400 to train the models 1316 while the classification data 1408 can be expanded into the expanded strings 1322 expansions based on the model(s) 1316 generated using the training data 1406.

The amount of the acronym strings 1332 for training the model(s) 1316 may be one percent of total acronyms of the acronym strings 1332. In some embodiments, the semi-automatic trainer 1400 includes a manual selector 1402 and a hierarchical clustering module 1404. The manual selector 1402 can be configured to receive a selection of strings of the acronym strings 1332 as the training data 1406 and an expanded string for each of the strings from a user via the user device 1334. In this regard, a domain expert can review the acronym strings 1332 via the user device 1334 and generate the selection of the training data 1406 based on user input provided by the user device 1334.

The hierarchical clustering module 1404 can be configured to perform automatic selection of the strings of the acronym strings 1332 for use as the training data 1406. A user, via the user device 1334 can provide expanded strings for each of the strings that the hierarchical clustering module 1404 selects for the training data 1406. In some embodiments, the hierarchical clustering module 1404 can be configured to cluster the acronym strings 1332 based on similarity and select representative strings from the clusters for the training data 1406. In some embodiments, the strings that are not selected for the training data 1406 are used as the classification data 1408 that the models 1316 classify into the expanded strings 1322.

The hierarchical clustering module 1404 can be configured to automatically select the minimal amount of data from the building site data 1330. The hierarchical clustering module 1404 can be configured to group similar sentences using intrinsic similarities in sensor metadata. The hierarchical clustering module 1404 can be configured to extract features from the acronym strings 1332 can group the strings according to the features. The features can indicate the same or similar acronyms and/or acronym patterns within the strings. The features can be based on operator given name, description, unit, and/or type.

In some embodiments, for a particular feature set, the hierarchical clustering model 1404 can generate a bag of words representation for each of the acronym strings 1332. The hierarchical clustering module 1404 can be configured to generate a similarity metric (e.g., a Manhattan distance) between sets of the acronym strings 1332 and cluster the acronyms based on least distance basis. The similarity metric can be a Manhattan distance, a cosine similarity, a Euclidean distance, etc.

Based on the clusters, the hierarchical clustering module 1404 can be configured to pseudo-randomly select one or a number of strings from each cluster. In some embodiments, the minimum number of selected acronym strings selected from each cluster is one. In some embodiments, therefore, if the hierarchical clustering module 1404 generates n number of clusters, a minimum set of the training data 1406 may be n strings. In some embodiments, the number of strings selected from each cluster is based on a total number of strings in each cluster, i.e., a proportion of strings are selected from each cluster.

In some embodiments, the hierarchical clustering module 1404 can be configured to determine a similarity distance for acronyms within each cluster as compared to each other. The hierarchical clustering module 1404 can be configured to select one of more sets of the acronym strings that are associated with a greatest similarity distance, i.e., are the most dissimilar. In some embodiments, the semi-automatic trainer 1400 trains the models 1316 with the same, or similar training algorithms with the training data 1406 as used by the fully automatic trainer 1312.

Figure 15:
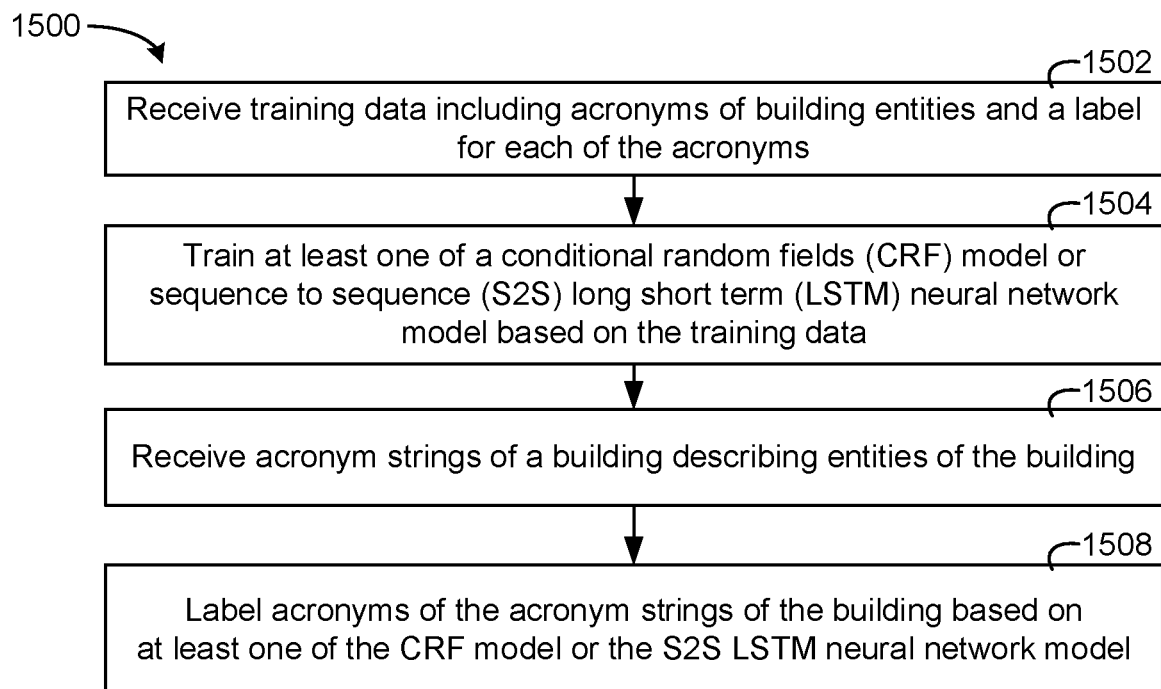
FIG. 15 is a flow diagram of a process of training a CRF model or a sequence to sequence neural network model and translating acronyms of a string to tags that can be performed by the building data labeler of FIGS. 13 and 14, according to an exemplary embodiment.

Referring now to FIG. 15, a flow diagram of a process 1500 of training a CRF model or a sequence to sequence neural network model and translating acronyms of a string to tags that can be performed by the building data labeler of FIGS. 13 and 14 is shown, according to an exemplary embodiment. The process 1500 can be performed by the building data labeler 1302, the user device 1334, and/or the BAS controller 202. In some embodiments, any computing system or device as described herein can be configured to perform the process 1500. For exemplary purposes, the process 1500 is described with reference to the building data labeler 1302.

In step 1502, the building data labeler 1302 receives training data including acronyms of building entities and a label for each of the acronyms. In some embodiments, the training data is the building training data 1324 including the acronym strings 1326 and the expanded strings 1328. The acronym strings 1326 can include a sentence of acronyms and/or symbols. The expanded strings 1328 can indicate a sentence of tags that the sentence of acronyms and/or symbols expands into.

In step 1504, the building data labeler 1302 trains at least one of a CRF model or a LSTM S2S neural network model based on the training data received in the step 1502. In some embodiments, the building data labeler 1302 trains the LSTM S2S model 1318 with the training data. In some embodiments, the building data labeler 1302 can train and utilize a sequence to sequence neural network. For example, the neural network can be a recurrent neural network (RNN). For example, a long-short term memory (LSTM) sequence to sequence (S2S) neural network (a type of RNN) and/or any other type of RNN (e.g., a gated recurrent unit (GRU) neural network). In some embodiments, the building data labeler 1302 trains the CRF model 1320. In some embodiments, building data labeler 1302 can train any type of probabilistic model, e.g., be a Bayesian network, a hidden Markov Model (HMM), a maximum entropy Markov model (MEMM), etc.

In step 1506, the building data labeler 1302 receives acronym strings of a building describing entities of the building. For example, the acronym strings may describe points of the building, equipment of the building, spaces of the building, users of the building, etc. In step 1508, the building data labeler 1302 can receive acronym strings for a particular building for which translation into expanded tag strings is desired. In step 1508, the building data labeler 1302 labels acronyms and/or characters of the acronym strings received in the step 1506 by applying the acronym strings to at least one of the CRF model 1320 or the LSTM S2S neural network 1318 trained in the step 1504.

Figure 16:
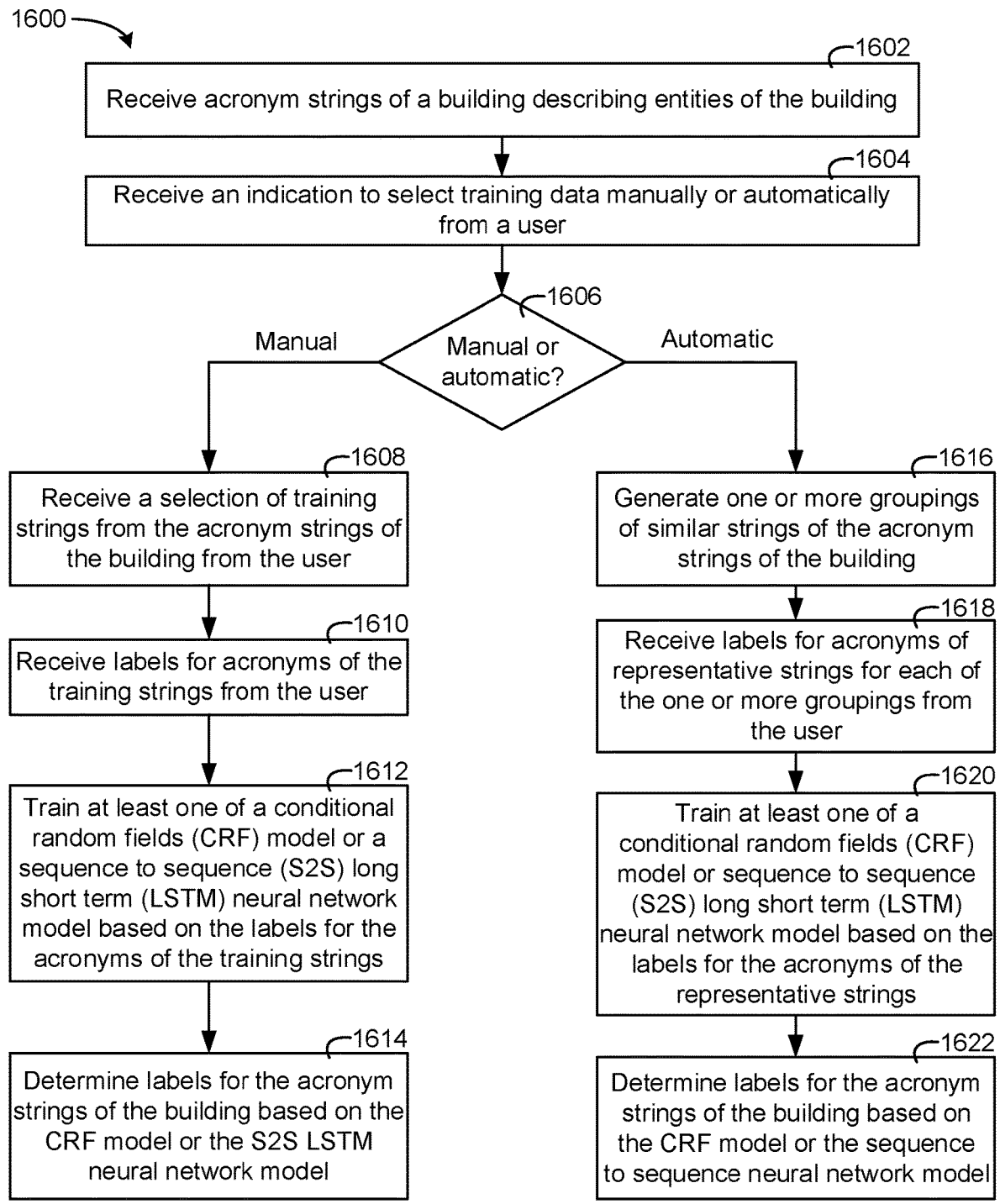
FIG. 16 is a flow diagram of a process of performing semi-automatic training of a CRF model or a sequence to sequence neural network model and translating acronyms of a string to tags that can be performed by the building data labeler of FIG. 14, according to an exemplary embodiment.

Referring now to FIG. 16, a flow diagram of a process 1600 is shown of performing semi-automatic training of a CRF model or a LSTM S2S neural network model and translating acronyms of a string to tags that can be performed by the building data labeler of FIG. 14, according to an exemplary embodiment. The process 1600 can be performed by the building data labeler 1302, the user device 1334, and/or the BAS controller 202. In some embodiments, any computing system or device as described herein can be configured to perform the process 1600. For exemplary purposes, the process 1500 is described with reference to the building data labeler 1302.

In step 1602, the building data labeler 1302 receives acronym strings of a building describing entities of the building. In some embodiments, the building data labeler 1302 receives the building site data 1330 including the acronym strings 1332. In step 1604, the building data labeler 1302 receives an indication to select training data manually or automatically from a user. In some embodiments, the building data labeler 1302 receives the indication from the user device 1334 via the training selector 1310.

In step 1606, the building data labeler 1302 determines whether to perform manual training or automatic training based on the indication received in the step 1604. In response to determining to perform the manual training, the building data labeler 1302 performs the steps 1608-1614. In response to determining to perform the automatic training, the building data labeler 1302 preforms the steps 1616-1622.

In step 1608, the building data labeler 1302 receives a selection from the user of training strings from the acronym strings of the building received in the step 1602. In some embodiments, the building data labeler 1302 receives the selection of the strings from the user device 1334. The selection of the strings may be the training data 1406, i.e., the user may manually select what strings the user wants to use as the training data in the step 1608.

In step 1610, the building data labeler 1302 receives labels for the acronyms of the training strings from the user. For example, the labels may be expanded tag strings of the acronyms where the tags of the tag strings correspond to acronyms, characters, and/or character sets within the acronym strings. The training strings and the corresponding expanded tag strings can together form the training data 1406.

In step 1612, the building data labeler 1302 trains at least one of a CRF model or a LSTM S2S neural network model based on the labels for the acronyms of the training strings received in the step 1610. In some embodiments, the building data labeler 1302 trains the LSTM S2S model 1318 with the training data 1406. In some embodiments, the building data labeler 1302 can train and utilize a sequence to sequence neural network. For example, a sequence to sequence recurrent neural network (RNN), a long-short term memory (LSTM) sequence to sequence (S2S) neural network (a type of RNN), and/or any other type of RNN (e.g., a gated recurrent unit (GRU) neural network). In some embodiments, building data labeler 1302 can train any type of probabilistic model, e.g., be a Bayesian network, a hidden Markov Model (HMM), a maximum entropy Markov model (MEMM), etc.

In step 1614, the building data labeler 1302 can determine labels for the acronym strings of the building based on the CRF model or the LSTM S2S neural network model. The building data labeler 1302 can apply the acronym strings received in the step 1602 as the input to the CRF model and/or the S2S neural network. The acronym strings input to the CRF model and/or the LSTM S2S neural network model may be the remaining strings not selected for use in training. In some embodiments, the acronym strings for classification are the classification data 1408.

In step 1616, the building data labeler 1302 can generate one or more groupings of similar strings of the acronym strings of the building received in the step 1602. The building data labeler 1302 can generate the groupings by calculating a similarity metric between the acronym strings and group the strings that have a similarity metric greater than a predefined level. In some embodiments, the building data labeler 1302 calculates a Manhattan distance between the acronym strings and groups strings together that have a Manhattan distance between each other less than a predefined amount.

In step 1618, the building data labeler 1302 receives labels for acronyms of representative strings for each of the one or more groups generated in the step 1616. The user may provide the labels for the acronyms of the representative strings, e.g., via the user device 1344. The representative strings may be selected from the groups generated in the step 1616 by the user via the user device 1344. In some embodiments, the representative strings are selected pseudo-randomly by the building data labeler 1302. In some embodiments, the building data labeler 1302 selects strings from the groups that have a lowest similarity to other strings, for example, a greatest Manhattan distance.

In steps 1620, the building data labeler 1302 trains at least one of the CRF model or the LSTM S2S model based on the labels for the acronyms of the representative strings. In step 1622, the building data labeler 1302 determines labels for the acronym strings received in the step 1602 based on the trained CRF model or the trained LSTM S2S neural network model. The steps 1620-1622 may be similar to the steps 1612 and 1614.

Figure 17:
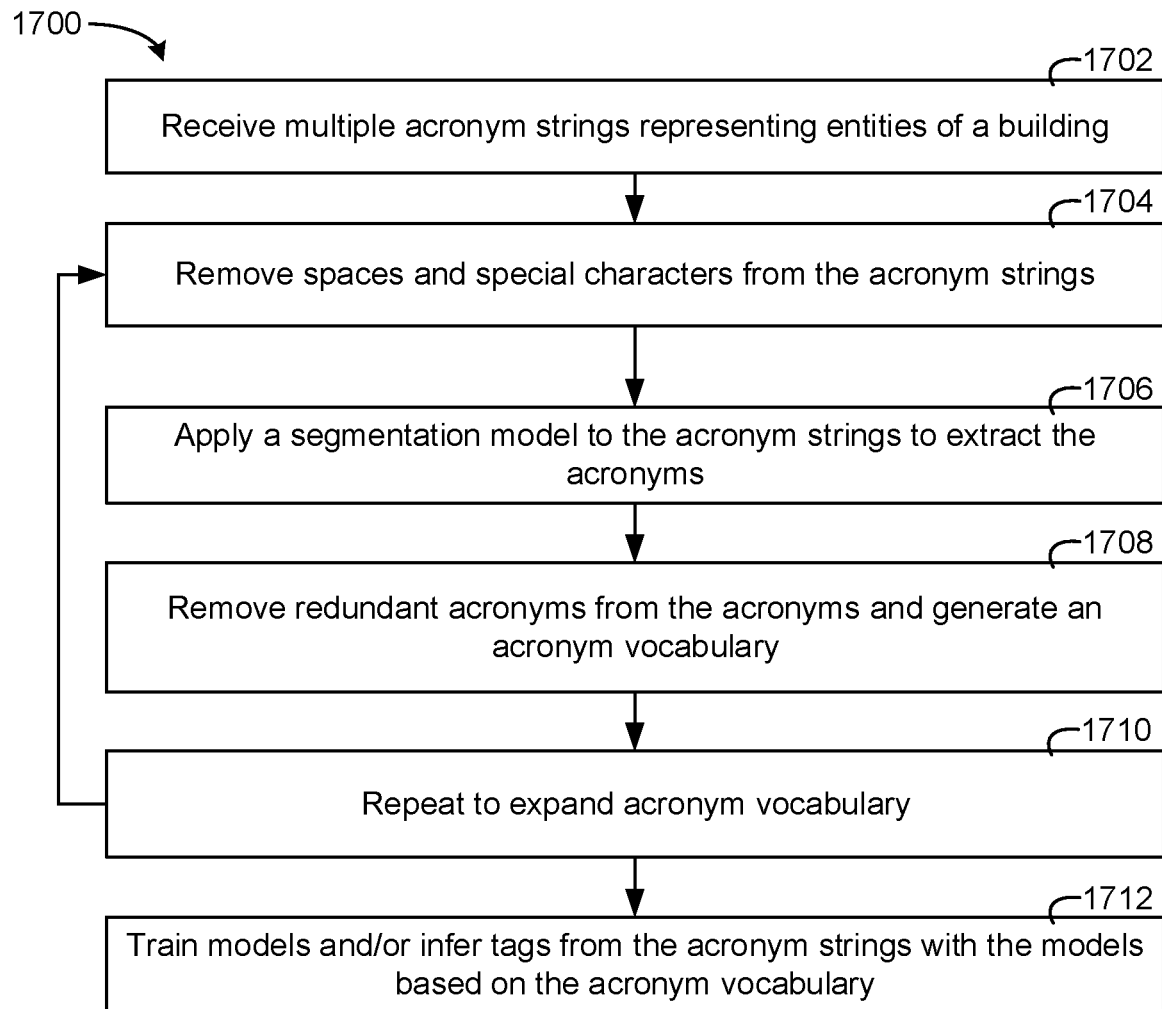
FIG. 17 is a flow diagram of a process of forming an acronym vocabulary, according to an exemplary embodiment.

Referring now to FIG. 17, a flow diagram of a process 1700 of forming an acronym vocabulary is shown, according to an exemplary embodiment. The process 1700 can be performed by the building data labeler 1302, the user device 1334, and/or the BAS controller 202. In some embodiments, any computing system or device as described herein can be configured to perform the process 1700. For exemplary purposes, the process 1700 is described with reference to the building data labeler 1302. In some embodiments, the building data labeler 1302 is configured to generate a vocabulary.

In step 1702, the building data labeler 1302 receives acronym strings representing entities of a building. The entities can be equipment points, pieces of equipment, spaces of a building, users, etc. In step 1704, the building data labeler 1302 preprocesses the acronyms by removing any space in front of an acronym and/or by removing any special character such as dots, commas, etc.

In step 1706, the building data labeler 1302 can apply a segmentation model to the acronym strings to extract the acronyms from the acronym strings. For example, the segmentation model could be a neural network based model that outputs segments of the acronym strings, i.e., the acronyms of the acronym strings. In some embodiments, the building data labeler 1302 applies the subword-nmt package and utilizes the acronym output of the subword-nmt package and ignores the frequency term output of the subword-nmt package.

In step 1708, the building data labeler 1302 removes redundant acronyms from the acronyms and generates an acronym vocabulary. In step 1710, the building data labeler 1302 can repeat the steps 1704-1708 to expand the acronym vocabulary, i.e., by processing the acronyms through the segmentation model a second time to identify expansions of the acronyms.

In step 1712, the building data labeler 1302 can train models and/or infer tags from the acronym strings with the models based on the acronym vocabulary and/or the expanded acronym vocabulary. The building data labeler 1302 can use the acronym vocabulary to embed the acronym strings and use the embedded acronym strings to train the models (e.g., the LSTM S2S model 1318 and/or the CRF model 1320) and/or infer the expanded strings from embedded acronym strings with the trained models. In some embodiments, the training data for training the models is used to generate the acronym vocabulary, this avoids requiring any additional ground truth data.

Referring generally to FIGS. 18-19, the performance of the LSTM S2S model 1318 and the CRF model 1320 are compared for large training data sets and small training data sets. The charts 1800 and 1900 of FIGS. 18 and 19 illustrate the analysis of data from three different sites. Table 1 illustrates the number of acronym sentences for reach of the sites. The acronym strings of the sites in table 1 can be used to evaluate the methods described herein at various training data volume and selected minimal ground truth.

TABLE 1

Public Data Set

| Site Name | Number of Sentences |
|---|---|
| Site 1 | 2551 |
| Site 2 | 1586 |
| Site 2 | 1865 |

In some embodiments, a line-by-line accuracy metric and a word-by-word accuracy metric can be utilized as accuracy evaluation metrics to compare the performance of the LSTM S2S model 1318 and the CRF model 1320. The word-by-word accuracy metric is a global accuracy measure while the line-by-line accuracy metric accounts for accuracy even a single error while translating. The word-by-word accuracy metric is determined as:

$$Word-by-word\ Accuracy = \frac{total\ matching\ words}{total\ words}$$

The line-by-line accuracy metric is determined as:

$$Line-by-Line\ Accuracy = \frac{\sum (line\ match)}{total\ number\ of\ lines}$$

where, $$line\ match = \begin{cases} 1 & if\ complete\ line\ matches \\ 0 & otherwise \end{cases}$$

In some embodiments, the CRF model 1320 and the LSTM S2S model 1318 for point mapping can utilize a vocabulary of acronyms and expansions. The LSTM S2S model 1318 can utilize the vocabulary of acronyms for word embedding based on the frequency of vocabulary entries appearing in the training data. Generating a vocabulary is described in greater detail with reference to FIG. 17.

FIG. 18 includes a chart 1800 illustrating word-by-word and line-by-line accuracy for large training data sets for the CRF model and the LSTM model and FIG. 19 includes a chart 1900 illustrating word-by-word and line-by-line accuracy for small training data sets for the CRF model and the LSTM model is shown. To generate the test results of FIGS. 18-19, the building data labeler 1302 can divide the datasets of Table 1 into training, evaluation, and testing sets.

Each sentence of the datasets of Table 1 can be identified by a unique identifier. The building data labeler 1302 selected from 80 to 20 percent of the data sets as the training data by pseudo-randomly shuffling the unique identifier. The building data labeler 1302 can pseudo-randomly select the evaluation and testing sets at a fixed 10 percent.

In FIG. 18, if a large amount of data is available for model training, it can be seen from the chart 1800 that the LSTM model perform better than the CRF model. In chart 1800, it can be seen that LSTM word-by-word accuracy as well as line-by-line accuracy is higher than the word-by-word and line-by-line accuracies of the CRF model. The word-by-word accuracy of the LSTM ranges from 98% to 99% percent whereas the line-by-line accuracy of the LSTM ranges from 93% to 98% percent.

In some buildings, there is not a significant amount of ground truth data for use as a training set. In some cases, the building data labeler 1302 relies on small amount of training data for model generation. As described with reference to FIG. 14, the hierarchical clustering module 1404 of the building data labeler 1302 can perform a hierarchical clustering method to select the key minimal data as training set and generate the ground truth for that data set.

When applied to the data of Table 1, the hierarchical clustering module 1404 identified 407 clusters. The clustering is based on raw acronyms only, in some embodiments. The clusters can be sorted by the hierarchical clustering module 1404 based on the numbers of samples in each cluster in a descending order.

In some embodiments, one training sample is randomly selected from each cluster by the hierarchical clustering module 1404 accounting to maximum of 407 training data strings. This results in about 6.8% of total data of the dataset of the Table 1. A user, e.g., via the user device 1334, can manually label the training data strings for expansions to create ground truth for training.

Chart 1900 of FIG. 19 illustrates the accuracy results for several CRF and LSTM models. The training data of FIG. 19 may be one acronym string selected from a top twenty clusters ordered in descending order based on size. The testing data can be the remaining acronyms apart from the training data. As shown in chart 1900, there is a 97.08% word-by-word accuracy when 120 data points, i.e., 2% of total data, is used for training a CRF model. This shows the tremendous potential of automatically choosing a small amount of training data for training. Chart 1900 indicates that CRF outperforms LSTMs when the amount of training data is very small (e.g., less than a predefined amount). The CRF achieved 97.08% to 98.63% in word-by-word accuracy and 86.38% to 91.73% in line-by-line accuracy for the training data size of 7% to 2%.

As discussed above, there may be two methods for point mapping, a fully automatic method as can be performed by the fully automatic trainer 1312 and/or a semi-automatic method as can be performed by semi-automatic trainer 1400. In the fully automatic method, a large volume of history building data and their ground truth may be available for model generation. These models can be used to translate any new building acronyms to their expansions automatically. The LSTM neural network 1200 including the attention function 1213 can perform better in this circumstance. The LSTM neural network 1200 achieves a word-by-word accuracy of 98% to 99% whereas the line-by-line accuracy ranges from 93% to 98%.

In the semi-automatic method, a set of raw data is selected from a new building for human labeling to generate ground truth. This selection may result in a small volume of training data that can be used to generate machine learning models which in turn can translate all the remaining acronyms of the new building to expansions. The CRF can be a better method for semi-automatic point mapping. The CRF can achieve 97.08% to 98.63% in word-by-word accuracy and 86.38% to 91.73% in line-by-line accuracy for the smaller training dataset size of 2% to 7% of total building points. Table 2 summarizes the performance of the CRF and LSTM models for various data set sizes, i.e., the large data set illustrated in FIG. 18 and the small data set illustrated in FIG. 19.

TABLE 2

Model Performance

| Training Data Set Size | Model | Evaluation Results | |
|---|---|---|---|
| Large | LSTM encoder and decoder with attention | word-by-word accuracy | 98.00%-99.00% |
| | | line by line accuracy | 93.00%-98.00% |
| Small | CRF | word-by-word accuracy | 97.08%-98.63% |
| | | line-by-line accuracy | 86.38%-91.73% |

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A building system comprising one or more memory devices configured to store instructions thereon that, when executed by one or more processors, cause the one or more processors to:
receive training data comprising a plurality of acronym strings and a plurality of tag strings, the plurality of acronym strings including a plurality of acronyms and the plurality of tag strings including a plurality of tags, wherein a string of the plurality of tag strings is a translation of one acronym string of the plurality of acronym strings, wherein the plurality of acronyms represent a plurality of entities of a building;
train a sequence to sequence neural network based on the training data;

receive an acronym string for labeling, the acronym string comprising a particular plurality of acronyms; and
generate a tag string for the acronym string with the sequence to sequence neural network, wherein the sequence to sequence neural network outputs a tag of the tag string for one acronym of the particular plurality of acronyms based on the one acronym and contextual information of the acronym string, wherein the contextual information includes other acronyms of the particular plurality of acronyms.

2. The building system of claim 1, wherein the sequence to sequence neural network is a long-short term memory (LSTM) sequence to sequence neural network.

3. The building system of claim 1, wherein the instructions cause the one or more processors to:
determine a number of strings of the plurality of acronym strings;
compare the number of strings to a threshold level; and
select the sequence to sequence neural network for translating the tag string from a group of available translation models in response to a determination that the number of strings is greater than the threshold level.

4. The building system of claim 1, wherein the instructions cause the one or more processors to receive the training data from a training database, wherein the training data is based on data of one or more buildings and the tag string is associated with the building.

5. The building system of claim 1, wherein the instructions cause the one or more processors to:
remove at least one of spaces or special characters from the plurality of acronym strings;
apply a segmentation model to the plurality of acronym strings to identify the particular plurality of acronyms;
generate an acronym vocabulary by removing redundant acronyms from the particular plurality of acronyms; and
train the sequence to sequence neural network based on the training data and the acronym vocabulary.

6. The building system of claim 1, wherein the instructions cause the one or more processors to receive a selection of a training function for training the sequence to sequence neural network from a user device, wherein the training function is at least one of:
a fully automatic training function wherein the sequence to sequence neural network is trained based on a training data set and inference with the sequence to sequence neural network is performed on a separate inference data set; or
a semi-automatic training function wherein the sequence to sequence neural network is trained on a portion of the inference data set and inference with the sequence to sequence neural network is performed with a remaining portion of the inference data set.

7. The building system of claim 1, wherein the semi-automatic training function is at least one of a manual selection function or a clustering function, wherein the manual selection function includes receiving a selection of the portion of the inference data set from a user device, wherein the clustering function includes identifying the portion of the inference data set by clustering the inference data set.

8. The building system of claim 1, wherein the sequence to sequence neural network includes an encoder that encodes the acronym string, a decoder that decodes hidden states of the sequence to sequence neural network into the tag string, and an attention function that generates an attention vector that weights an output of the decoder.

9. The building system of claim 8, wherein the attention function is based on one hidden state of the decoder and a plurality of hidden states of the encoder, each of the plurality of hidden states associated with at least one of the particular plurality of acronyms;
wherein the attention vector weights the one hidden state of the decoder across a plurality of target tags.

10. The building system of claim 1, wherein the sequence to sequence neural network implements a many to many mapping between the particular plurality of acronyms and a plurality of target tags.

11. The building system of claim 10, wherein the many to many mapping maps:
the one acronym of the particular plurality of acronyms to a first target tag when the contextual information is first contextual information and to a second target tag when the contextual information is second contextual information; and
a different acronym of the particular plurality of acronyms to the first target tag based on other contextual information associated with the different acronym, wherein the one acronym and the different acronym include different characters.

12. The building system of claim 1, wherein the instructions cause the one or more processors to:
receive a set of acronym strings for the building for translation;
select the plurality of acronym strings from the set of acronym strings;
receive the plurality of tag strings from a user device, each of the plurality of tag strings being the translation of one of the plurality of acronym strings;
train the sequence to sequence neural network based on the training data; and
translate remaining acronym strings of the set of acronym strings with the sequence to sequence neural network.

13. The building system of claim 12, wherein the instructions cause the one or more processors to receive a manual selection of the plurality of acronym strings from the user device.

14. The building system of claim 12, wherein the instructions cause the one or more processors to receive the plurality of tag strings from the user device via user input provided by a user via the user device, the user input indicating tag translations of particular acronyms of the plurality of acronym strings.

15. The building system of claim 12, wherein the instructions cause the one or more processors to select the plurality of acronym strings from the set of acronym strings by:
determining a similarity metric between acronym strings of the set of acronym strings;
generate a plurality of clusters by grouping the acronym strings based on the similarity metric between the acronym strings of the set of acronym strings; and
select the plurality of acronym strings from the set of acronym strings by selecting one or more acronym strings from each of the plurality of clusters.

16. The building system of claim 15, wherein the instructions cause the one or more processors to cause the user device to display the plurality of acronym strings to the user for manual translation.

17. A method comprising:
receiving, by one or more processing circuits, training data comprising a plurality of acronym strings and a plurality of tag strings, the plurality of acronym strings including a plurality of acronyms and the plurality of tag strings including the plurality of tags, wherein a string of the plurality of tag strings is a translation of one acronym string of the plurality of acronym strings, wherein the plurality of acronyms represent a plurality of entities of a building;

training, by the one or more processing circuits, a sequence to sequence neural network based on the training data;

receiving, by the one or more processing circuits, an acronym string for labeling, the acronym string comprising a particular plurality of acronyms; and generating, by the one or more processing circuits, a tag string for the acronym string with the sequence to sequence neural network, wherein the sequence to sequence neural network outputs a tag of the tag string for one acronym of the particular plurality of acronyms based on the one acronym and contextual information of the acronym string, wherein the contextual information includes other acronyms of the particular plurality of acronyms.

18. The method of claim 17, further comprising:

determining, by the one or more processing circuits, a number of strings of the plurality of acronym strings;

comparing, by the one or more processing circuits, the number of strings to a threshold level; and selecting, by the one or more processing circuits, the sequence to sequence neural network for translating the tag string from a group of available translation models in response to a determination that the number of strings is greater than the threshold level.

19. The method of claim 17, wherein the sequence to sequence neural network implements a many to many mapping between the particular plurality of acronyms and a plurality of target tags;

wherein the many to many mapping maps:
the one acronym of the particular plurality of acronyms to a first target tag when the contextual information is first contextual information and to a second target tag when the contextual information is second contextual information; and
a different acronym of the particular plurality of acronyms to the first target tag based on other contextual information associated with the different acronym, wherein the one acronym and the different acronym include different characters.

20. The method of claim 17, wherein the sequence to sequence neural network is a long-short term memory (LSTM) sequence to sequence neural network;

wherein the sequence to sequence neural network includes an encoder that encodes the acronym string, a decoder that decodes hidden states of the sequence to sequence neural network into the tag string, and an attention function that generates an attention vector that weights an output of the decoder.

21. The method of claim 20, wherein the attention function is based on one hidden state of the decoder and a plurality of hidden states of the encoder, each of the plurality of hidden states associated with at least one of the particular plurality of acronyms;

wherein the attention vector weights the one hidden state of the decoder across a plurality of target tags.

22. One or more non-transitory storage medium configured to store instructions thereon, that, when executed by one or more processors, cause the one or more processors to:

receive training data comprising a plurality of acronym strings and a plurality of tag strings, the plurality of acronym strings including a plurality of acronyms and the plurality of tag strings including a plurality of tags, wherein a string of the plurality of tag strings is a translation of one acronym string of the plurality of acronym strings;

train a sequence to sequence neural network based on the training data;

receive an acronym string for labeling, the acronym string comprising a particular plurality of acronyms, a first acronym of the particular plurality of acronyms representing a building space and a second acronym of the particular plurality of acronyms representing piece of building equipment within the building space; and generate a tag string for the acronym string with the sequence to sequence neural network, wherein the sequence to sequence neural network outputs a tag of the tag string for one acronym of the particular plurality of acronyms based on the one acronym and contextual information of the acronym string, wherein the contextual information includes other acronyms of the particular plurality of acronyms, wherein a first tag of the tag string represents the building space and a second tag of the tag string represents the piece of building equipment.

* * * * *